(12) United States Patent
Mock

(10) Patent No.: US 10,683,949 B1
(45) Date of Patent: Jun. 16, 2020

(54) UNIVERSAL, ADJUSTABLE, SPLICEABLE, BRACKET FORMING, AND STRAPPING MATERIAL

(71) Applicant: Carl Mock, San Angelo, TX (US)

(72) Inventor: Carl Mock, San Angelo, TX (US)

( * ) Notice: Subject to any disclaimer, the term of this patent is extended or adjusted under 35 U.S.C. 154(b) by 265 days.

(21) Appl. No.: 15/494,509

(22) Filed: Apr. 23, 2017

Related U.S. Application Data

(60) Provisional application No. 62/494,252, filed on Aug. 1, 2016.

(51) Int. Cl.
| | | |
|---|---|---|
| *F16L 3/04* | (2006.01) | |
| *F16L 3/14* | (2006.01) | |
| *H02G 1/00* | (2006.01) | |
| *H02G 3/30* | (2006.01) | |

(52) U.S. Cl.
CPC .. *F16L 3/14* (2013.01); *F16L 3/04* (2013.01)

(58) Field of Classification Search
CPC ..... F16L 3/04; F16L 3/14; F16L 3/137; F16L 3/233; H02G 1/00; H02G 3/125; H02G 3/30
USPC ............ 248/49, 56, 57, 58, 60, 65, 68.1, 71; 174/72 A; D8/356
See application file for complete search history.

(56) References Cited

U.S. PATENT DOCUMENTS

| 1,086,442 | A | * | 2/1914 | Cornelius | ................. F16L 3/14 |
| | | | | | 24/17 A |
| 1,804,472 | A | * | 5/1931 | Leslie | ....................... F16L 3/14 |
| | | | | | 24/60 |
| 2,542,172 | A | * | 2/1951 | Wold | ........................ F16L 3/14 |
| | | | | | 248/60 |
| 2,648,326 | A | * | 8/1953 | Epstein | ..................... F16L 5/00 |
| | | | | | 126/317 |
| 2,707,607 | A | * | 5/1955 | O'Connor | ............. F16L 3/1233 |
| | | | | | 248/60 |
| 3,744,094 | A | * | 7/1973 | Bach | ...................... C07K 1/006 |
| | | | | | 24/16 PB |
| 4,550,451 | A | * | 11/1985 | Hubbard | ................. E03C 1/021 |
| | | | | | 248/56 |
| 4,909,461 | A | * | 3/1990 | Collins | ................... E03C 1/021 |
| | | | | | 248/57 |

(Continued)

FOREIGN PATENT DOCUMENTS

| GB | 1133159 A | * | 11/1968 | ................ F16B 2/08 |
| SU | 1451413 A1 | * | 1/1989 | ................ F16L 3/14 |

*Primary Examiner* — Joshua E Rodden

(57) ABSTRACT

A metal strip, perforated lengthwise along its center by a row of closely and regularly spaced holes, with rows of other perforations providing uniformly spaced, incremental rows of perforations, each row perpendicular to the length of the strip, whereby, using only simple hand tools, sections of strip can be incrementally broken off, by repeatedly bending back and forth along the line of a perpendicular row of perforations until stress fractures result, whereupon said sections of strip can be quickly, easily, and repeatedly fabricated into mounting brackets and straps of desired shapes, by bending appropriate perpendicular rows of perforations within said sections of strip to desired angles, while segments between bends tend to remain straight and flat, said mounting brackets and straps to be attached to supporting structures, or other sections of strip, using the center holes as necessary, utilizing existing fastening devices, such as screws, bolts and nuts, or rivets.

17 Claims, 17 Drawing Sheets

(56) References Cited

U.S. PATENT DOCUMENTS

| | | | | |
|---|---|---|---|---|
| 4,957,251 A * | 9/1990 | Hubbard | .................... | F16L 3/22 |
| | | | | 248/126 |
| 5,405,111 A * | 4/1995 | Medlin, Jr. | ............ | H02G 3/125 |
| | | | | 248/205.1 |
| 6,012,685 A * | 1/2000 | Saraceno, Jr. | ........... | H02G 1/00 |
| | | | | 248/68.1 |
| 6,202,962 B1 * | 3/2001 | Snyder | .................... | F16L 3/137 |
| | | | | 24/16 PB |
| 6,375,128 B1 * | 4/2002 | Condon | .................... | F16L 3/24 |
| | | | | 248/57 |
| 6,437,241 B1 * | 8/2002 | Neujahr | ................. | H02G 3/088 |
| | | | | 174/58 |
| 7,039,965 B1 * | 5/2006 | Ismert | ..................... | E03C 1/021 |
| | | | | 248/56 |
| 7,559,512 B1 * | 7/2009 | diGirolamo | ........... | F16L 3/1233 |
| | | | | 24/23 R |
| 7,926,765 B1 * | 4/2011 | Brown | .................... | E03C 1/021 |
| | | | | 248/57 |
| 9,385,513 B2 * | 7/2016 | Jones | ........................ | H02G 1/00 |
| 2014/0262479 A1 * | 9/2014 | Abalian | ................... | H02G 3/30 |
| | | | | 174/480 |

\* cited by examiner

FIG. 1
FIG. 2
FIG. 3
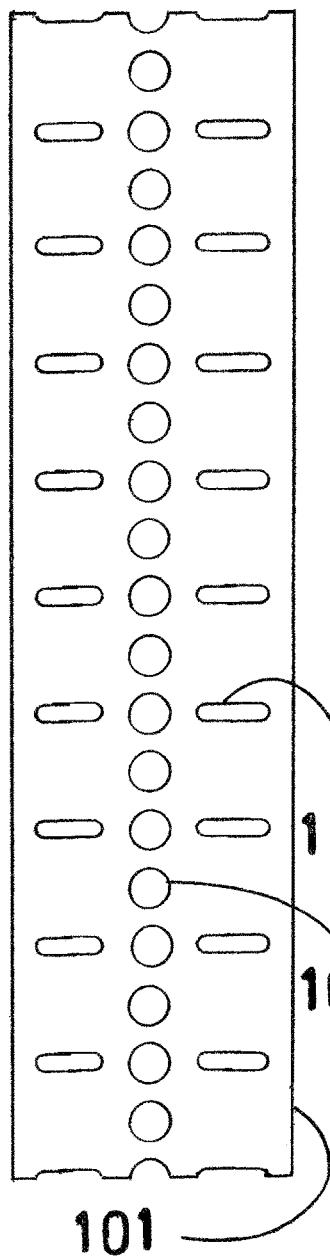
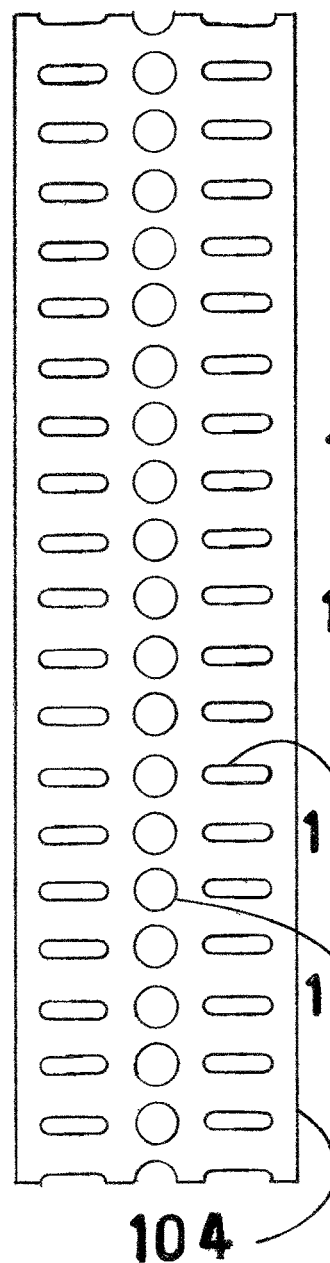
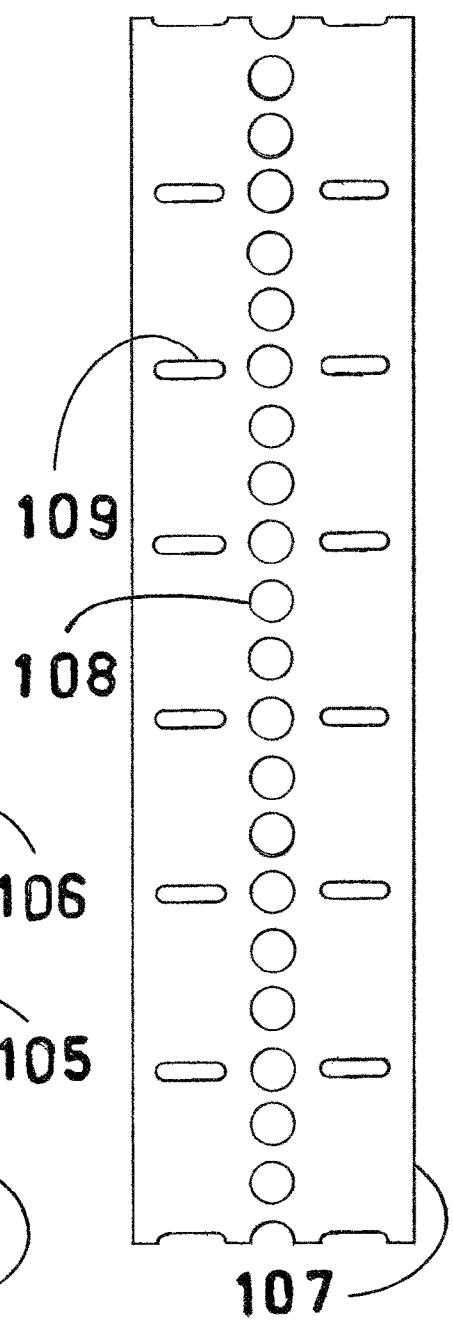

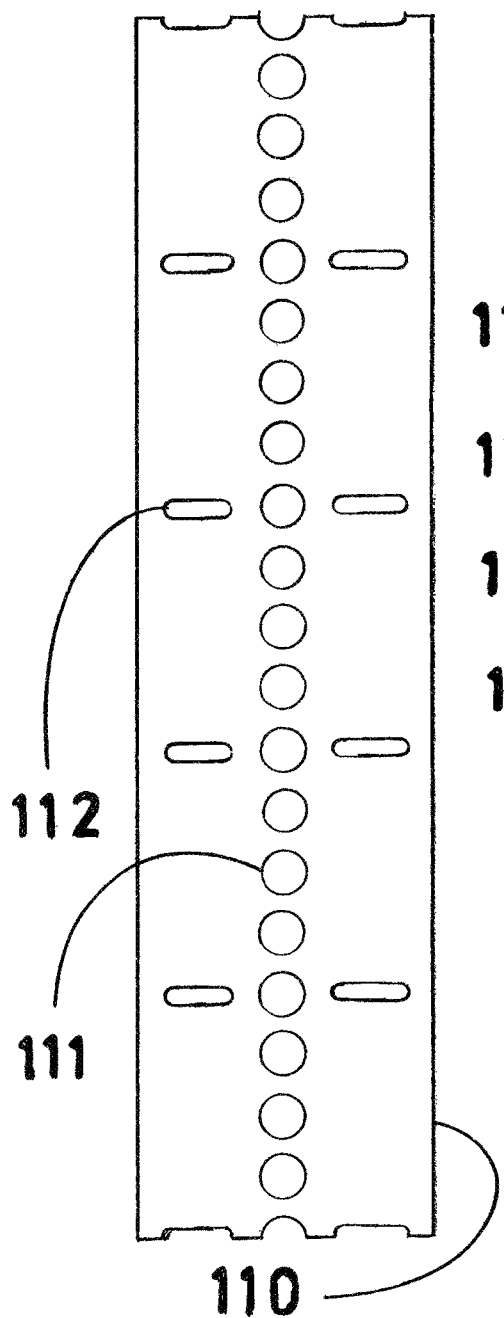
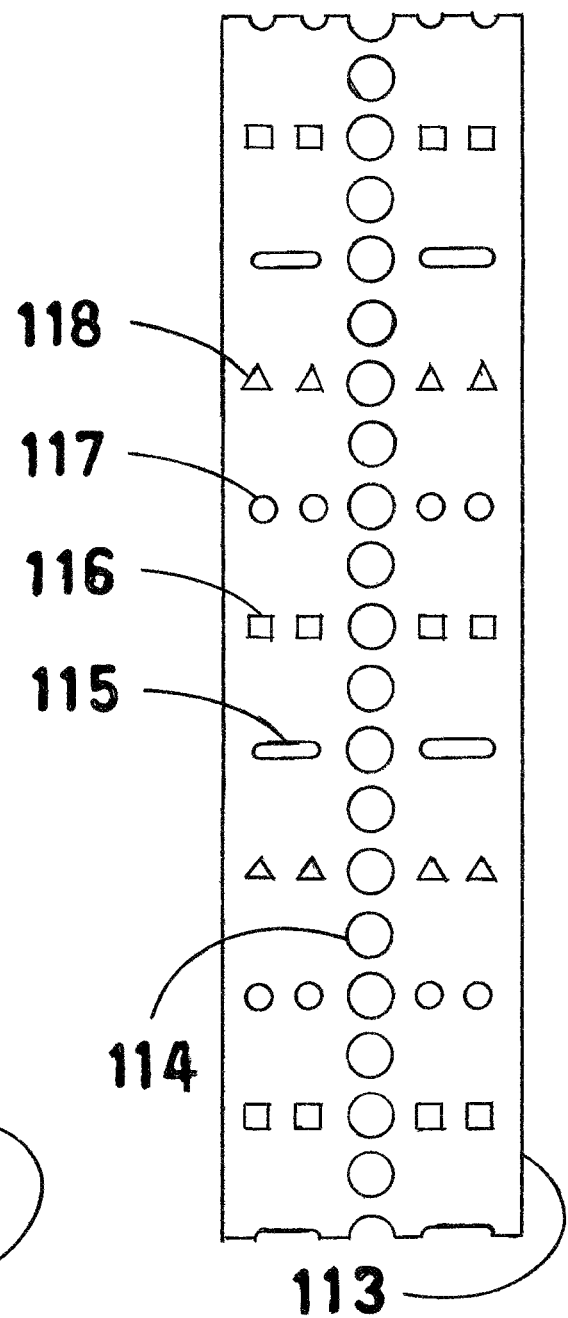

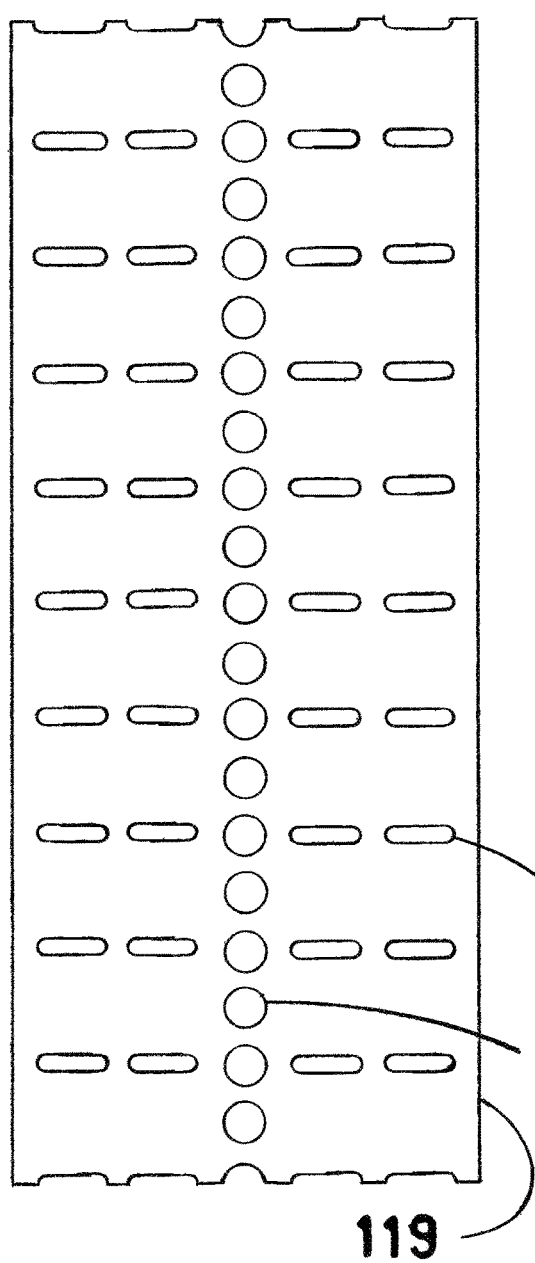
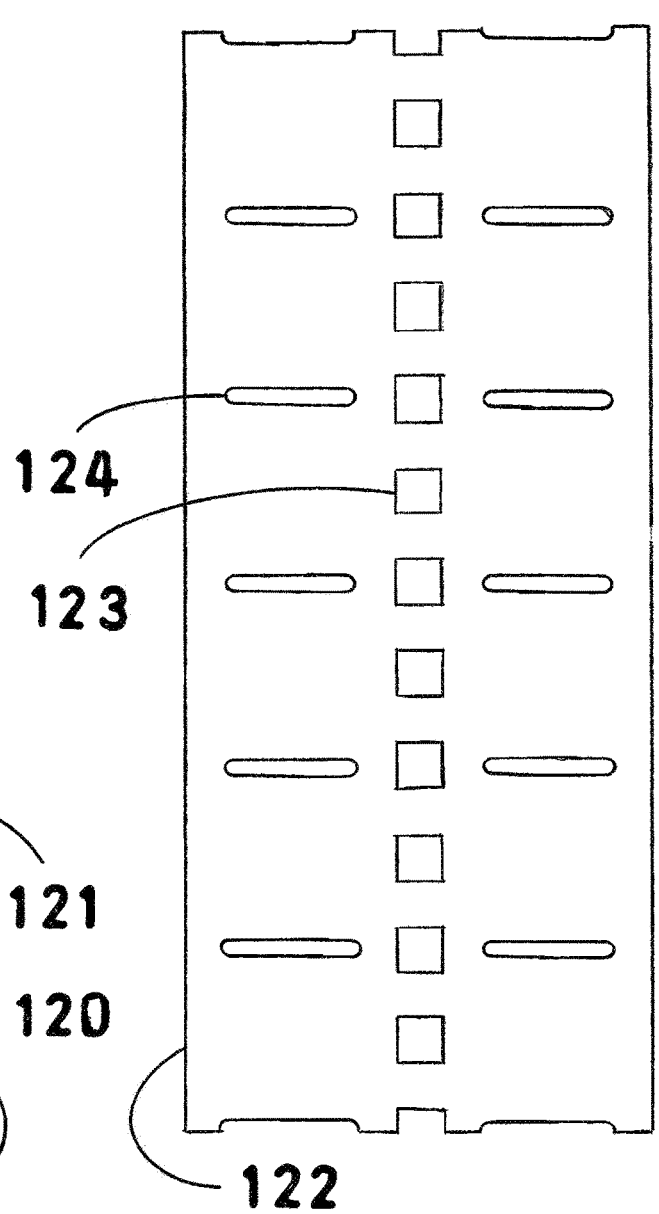
FIG.6
FIG.7

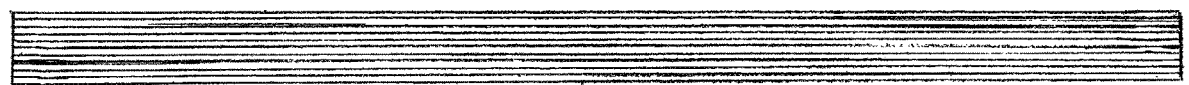
FIG. 9  128
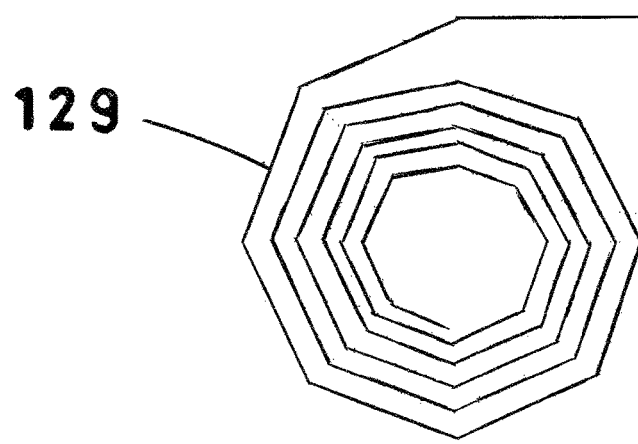
129  FIG. 10
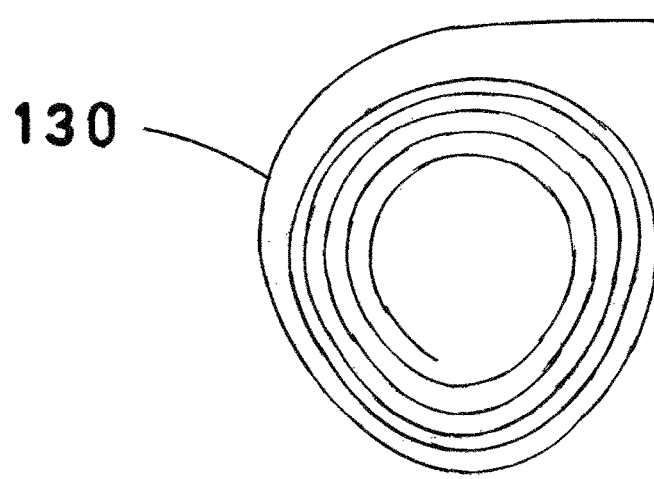
130  FIG. 11

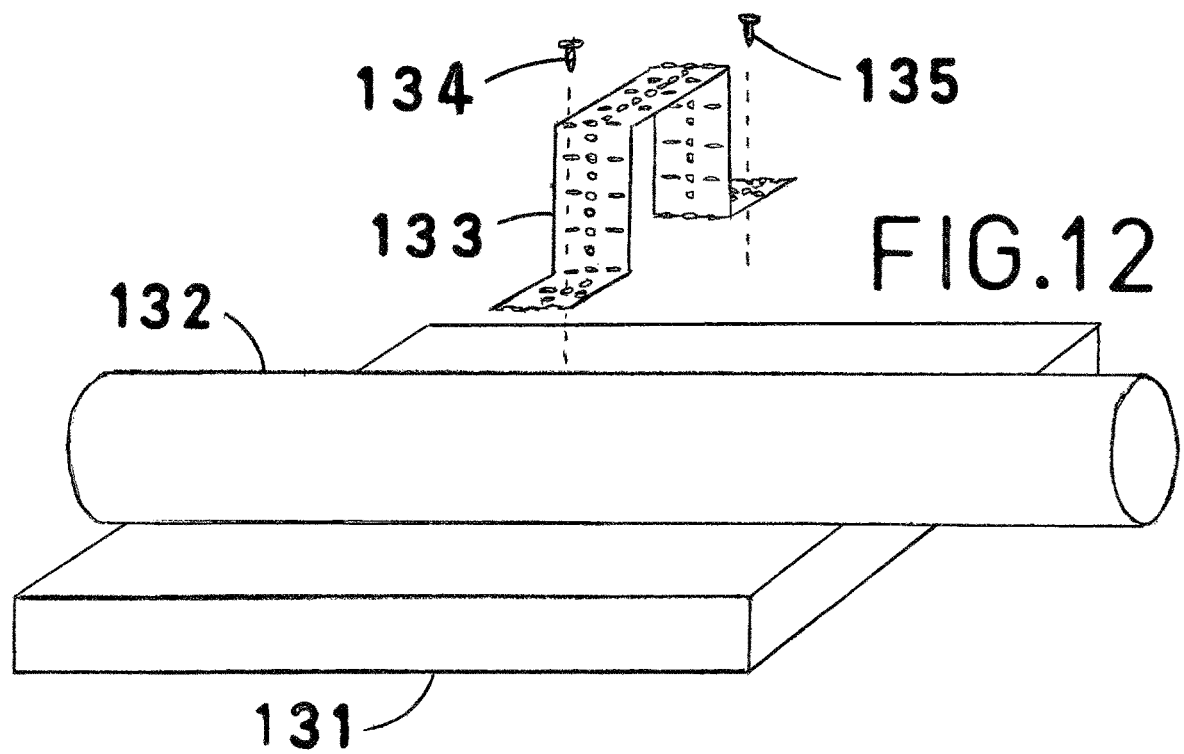
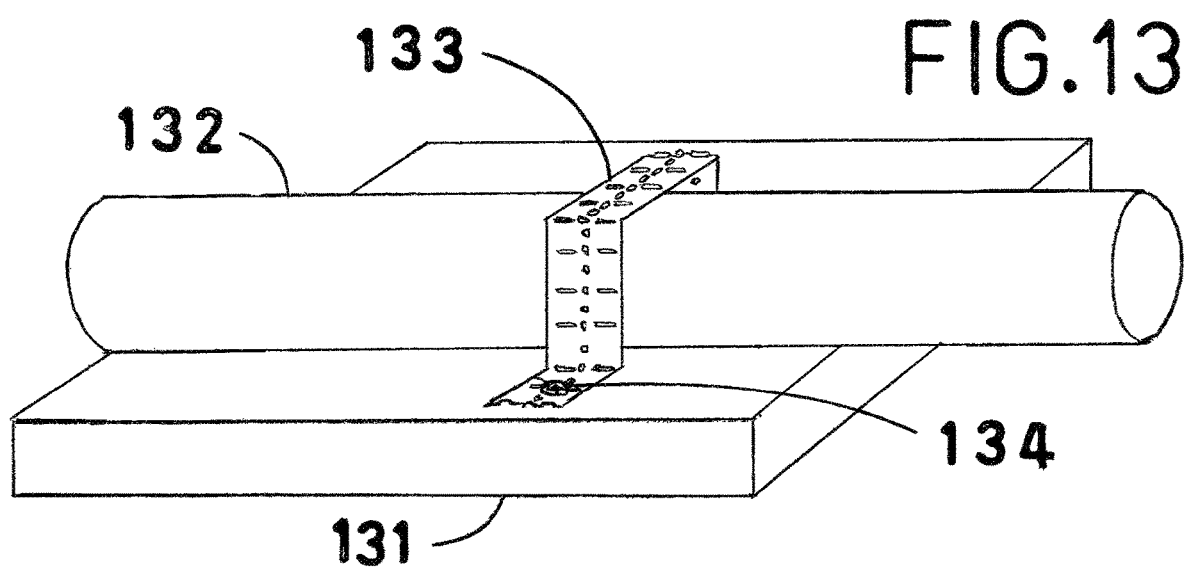

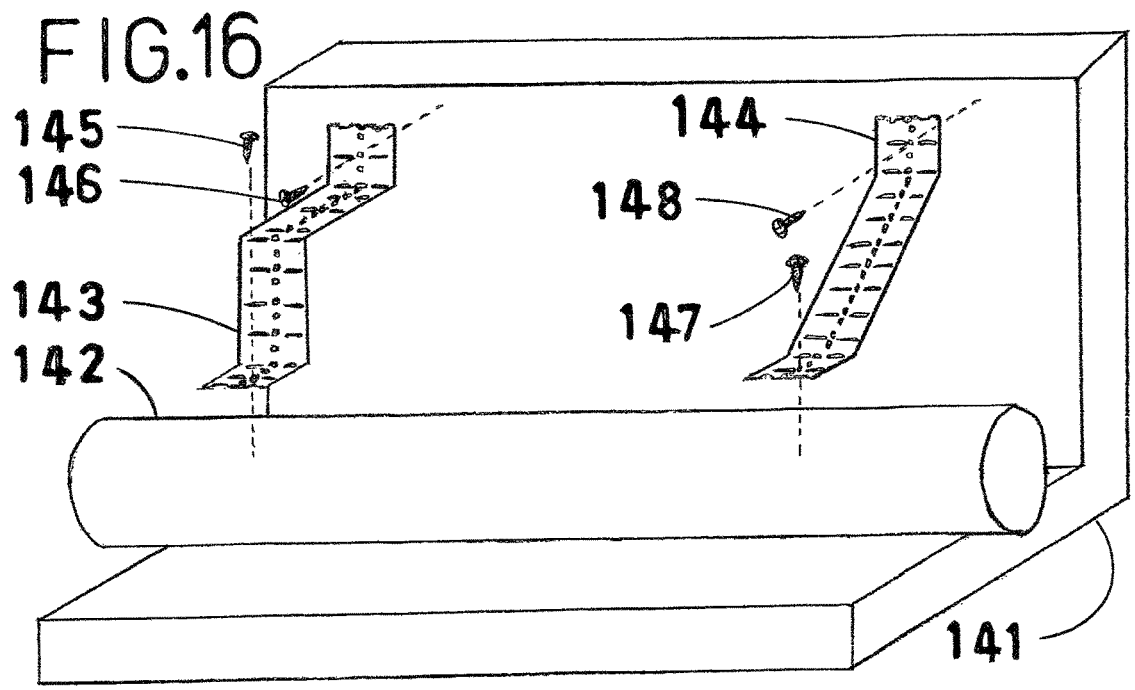
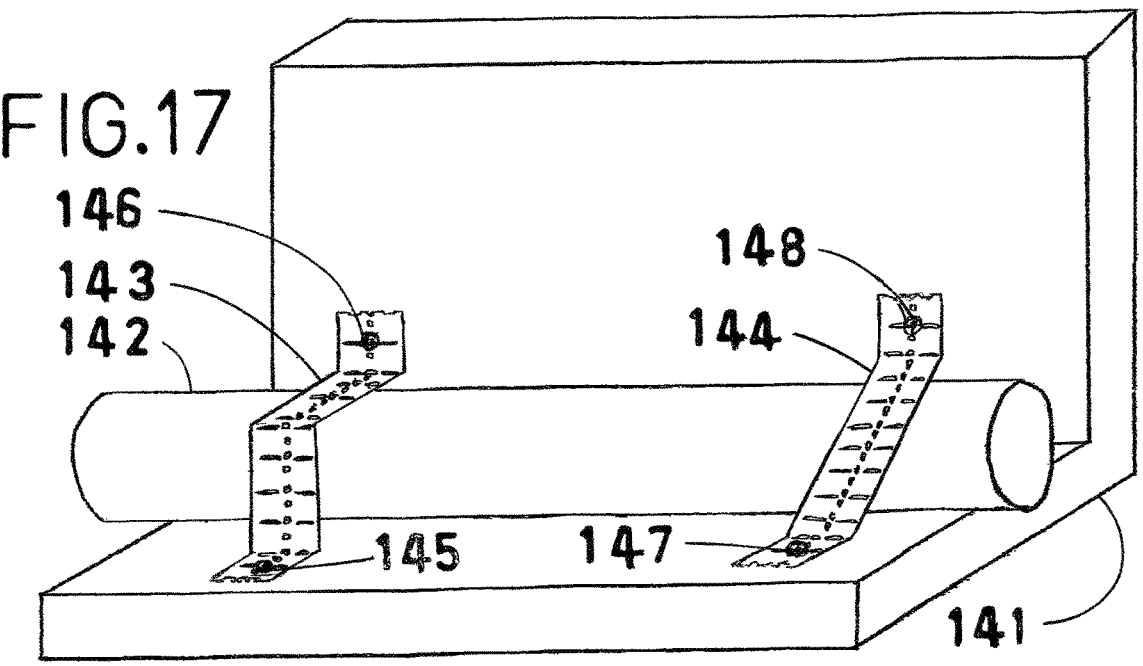

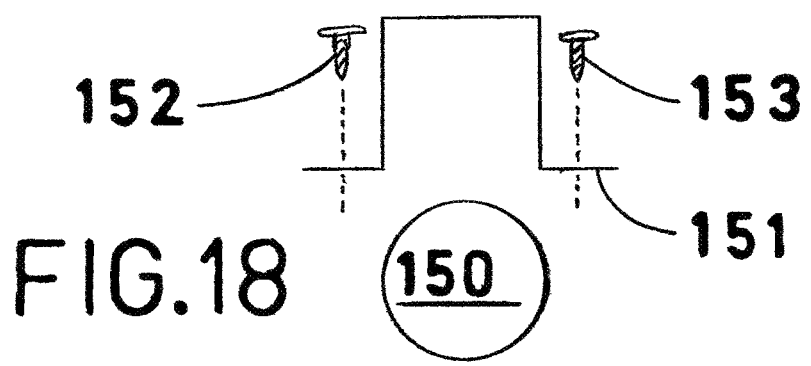
FIG.18
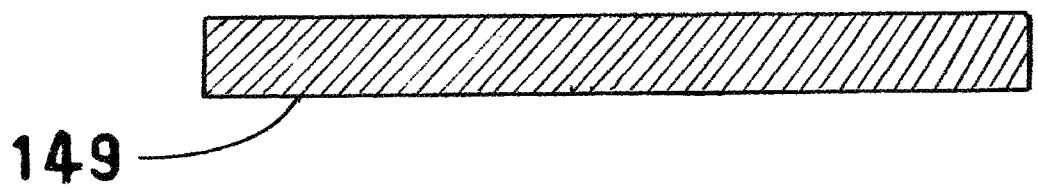
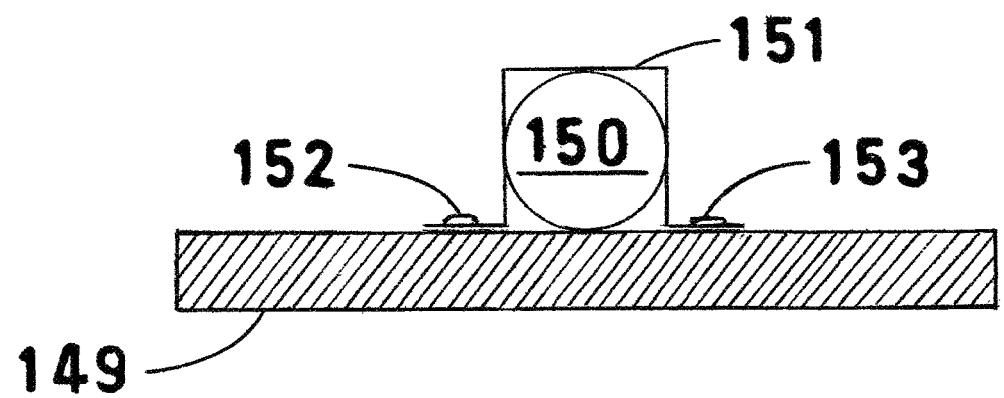
FIG.19

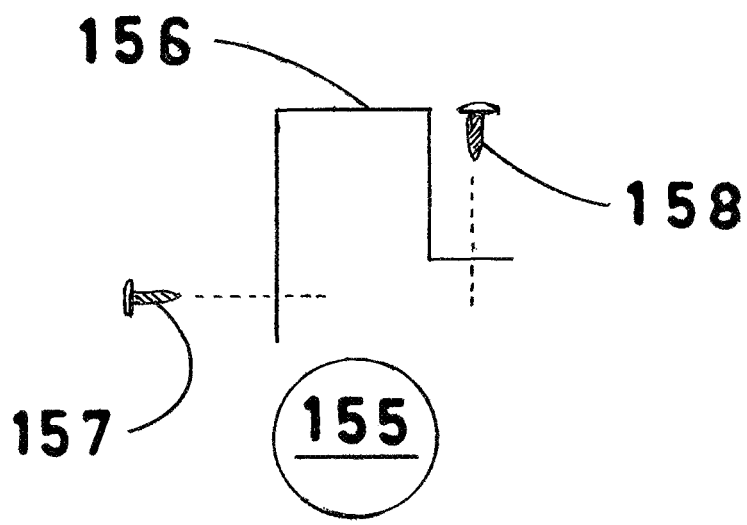
FIG. 20
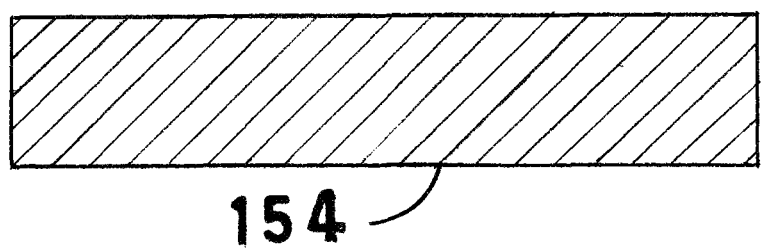
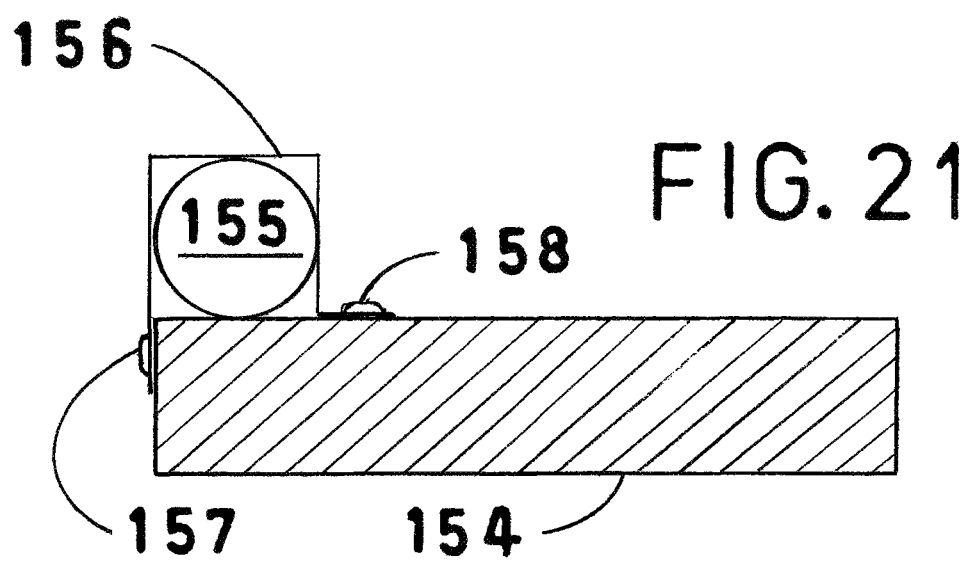
FIG. 21

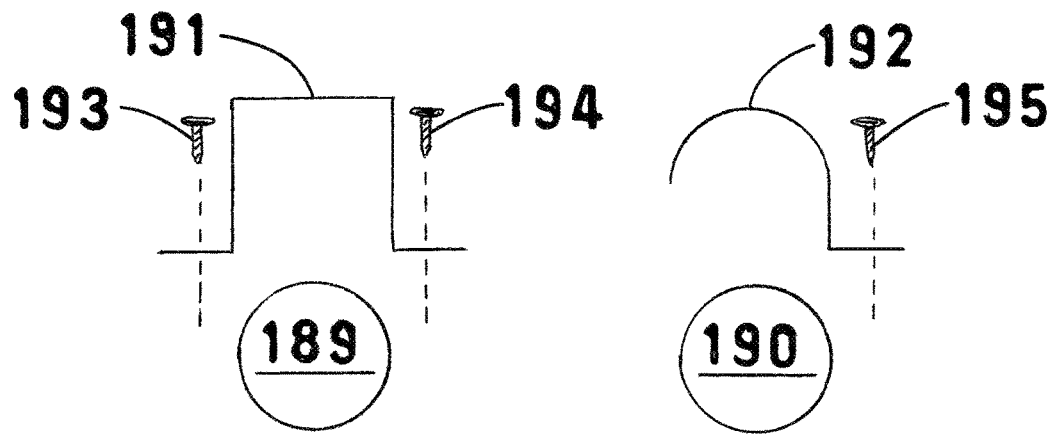
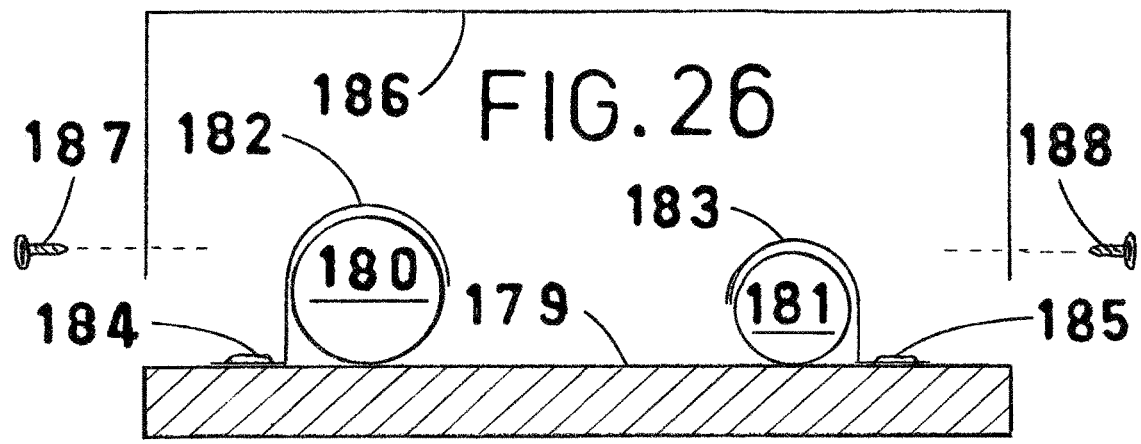

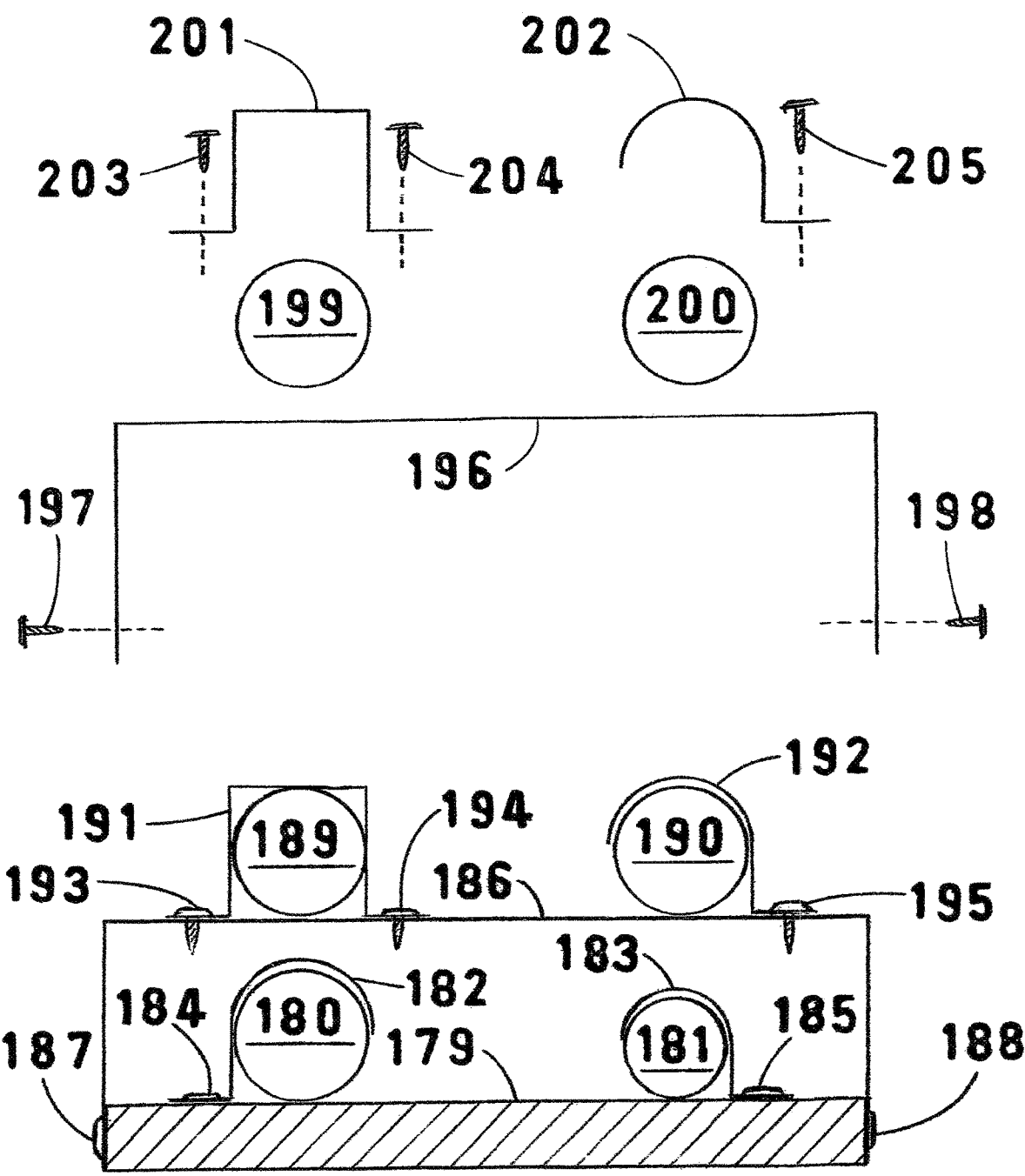

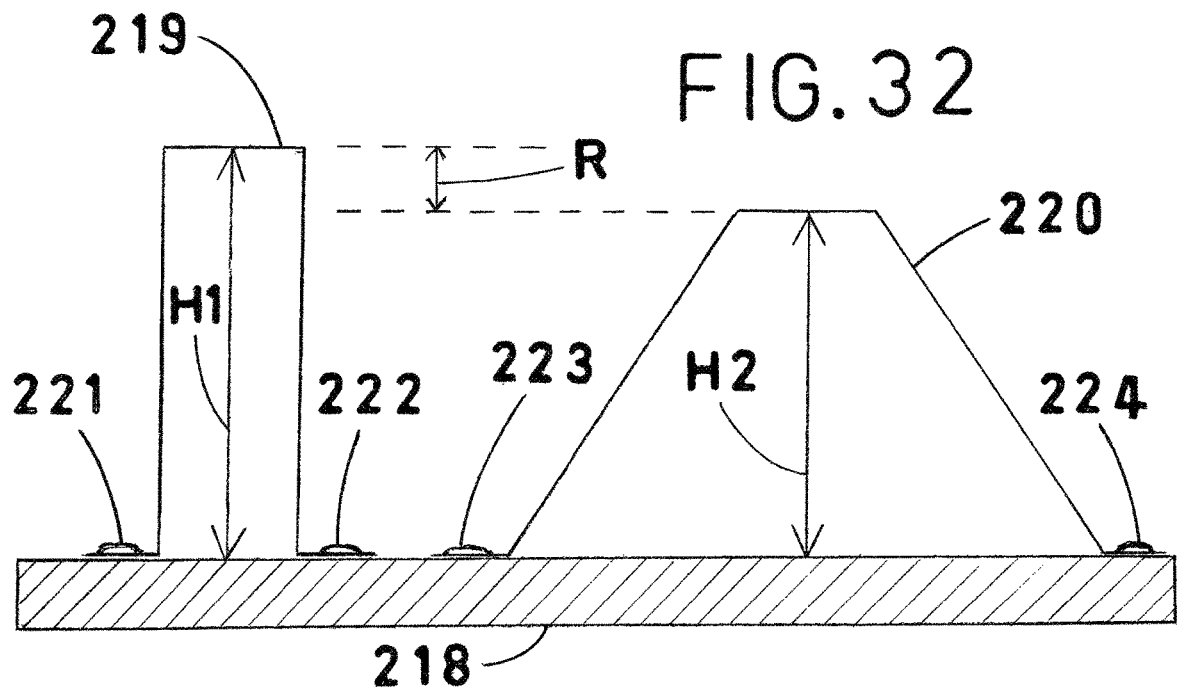
FIG. 32
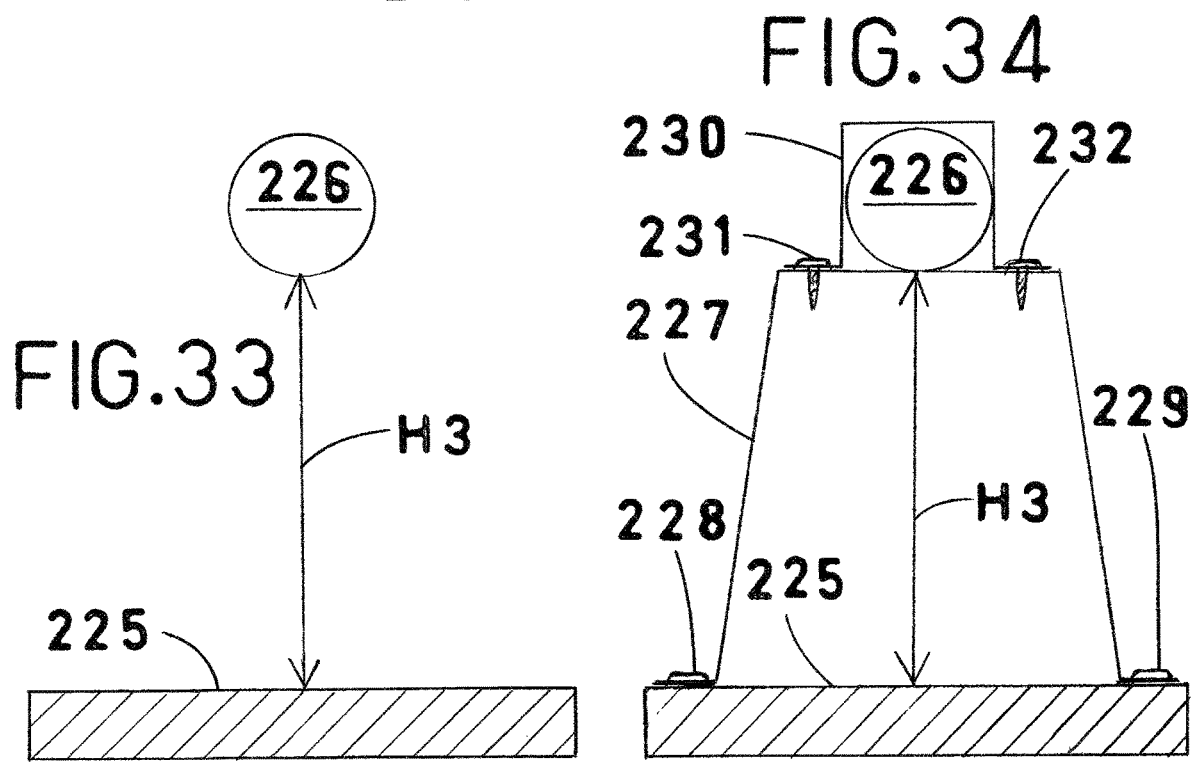
FIG. 33
FIG. 34

UNIVERSAL, ADJUSTABLE, SPLICEABLE, BRACKET FORMING, AND STRAPPING MATERIAL

STATEMENT REGARDING FEDERALLY SPONSORED RESEARCH OR DEVELOPMENT

Not Applicable

REFERENCE TO A SEQUENCE LISTING, TABLE, OR COMPUTER PROGRAM ON A COMPACT DISC

Not Applicable

BACKGROUND OF THE INVENTION

There are many products used in construction and industry that require external support for their proper installation and operation. Some examples are elongated cylindrical forms including electrical conduits and cables, data cables, water pipes, drain pipes, natural gas pipes, compressed air lines, refrigeration lines, vacuum lines, fuel lines, hydraulic tubes and hoses, and tubes and hoses used to feed chemicals. They often require periodic support along their length. Other products are small modular items like relays, switches, and sensors that need to be mounted or secured in place.

Some of these items can sometimes be supported by installing them underground, or otherwise imbedding them in a supporting matrix, such as concrete. Sometimes they can be strapped, or otherwise affixed directly to an existing structure or surface. Many times, however, there is no practical route, or means whereby the item can be attached directly to an existing structure. In such cases, an intermediary device is required to connect an existing structure to the item requiring support. Such an intermediary device is called a support bracket. A support bracket is attached to an existing structure, normally using existing fastening devices, such as nails, screws, bolts and nuts, rivets, and the like. The item to be supported is attached to the bracket. In some cases, the attachment may be accomplished by a mutually compatible design of a particular bracket for a particular product, so that the item to be supported somehow snaps, or otherwise locks into place. In more general applications, items to be supported are attached to a bracket utilizing a wide variety of existing fastening devices, including straps, clamps, screws, bolts and nuts, rivets, and the like.

Support brackets already exist in an almost endless variety of forms, but they are generally prefabricated and designed for use with a single product, or a very limited range of products. My invention is intended to be as adaptable as possible, for use in the maximum possible number of applications. My invention provides its user with the ability to quickly and accurately fabricate support brackets, and/or straps, for an almost limitless number of applications. The exact shape and size of the support brackets, and/or straps, required for a job can be determined on-site. They can be designed, fabricated, and installed on-site. All this is easily accomplished by any worker of ordinary skill, using ordinary hand tools. No special tools, electrical power, or batteries required.

Each day, workers in different trades face the same problem. How to support, or secure in place, something that cannot conveniently be directly attached to an existing structure. For conduits, pipes, tubing, and the like, attachment devices already exist such as straps, clamps, and vertical hangers. These devices are normally trade specific, and intended only for specific trade sizes. Vertical hangers can sometimes provide a simple, direct route, but their use requires a suitable overhead structure. Often, there is no such structure, and even if there is, this method can be costly, difficult, and time consuming. Straps generally require that the item to be supported be routed into physical contact with an existing structure. Clamps generally require that the item to be supported either be routed into physical contact with an existing structure, or brought within a very close, specified distance. Straps and clamps both provide points of support for items such as conduits and pipes, but they also require that the conduit or pipe be routed either along an existing surface, or from one existing structure to another. Even minor deviations from a straight line in the positioning of these points of support may require that the conduit or pipe be bent, or assembled using angled fittings. This requires more time, more expertise, and more material.

My invention allows items like conduits or pipes to be routed in straighter, more direct lines because, within a certain range, deviations in their distance from nearby existing structures can be compensated for by the variation allowed by the custom, on-site, hand fabrication of support brackets made of my invention. The exact range of variation for a bracket fabricated from my invention would be determined by several factors, including the size and weight of the item to be supported, and which embodiment of the invention is utilized. Various embodiments of the invention will be discussed in greater detail in following sections of this application. Items such as conduits or pipes can be attached to brackets thus fabricated, using either conventional straps, or straps fabricated from other sections of strip. In either case, the straps are normally attached to the bracket by using existing forms of fastening devices, such as screws, bolts and nuts, rivets, and the like.

When determining how to support an item such as a conduit or pipe, workers can approach the problem in one of two ways. One, they can introduce bends, and/or angled fittings into the piping system, so as to route the conduit or pipe along a series of points of attachment to existing structures, this being done solely for the purpose of support, requiring more time, expertise, and material. Or two, they can improvise supporting structures from scratch, in an effort to keep the conduit or pipe as straight as possible. Both approaches are time consuming, labor intensive, and require a high level of skill on the part of the person who does the work. Moreover, every time such a problem arises it is a new problem, and must be solved from scratch. My invention conceives of support brackets and straps in an entirely new way. Instead of having to improvise supporting structures from scratch, my invention provides its user with a means of easily, quickly, and accurately designing, fabricating, and installing adaptable support brackets, and straps, on-site, for a wide variety of applications, in multiple trades, and fields of endeavor. All this being done using only this invention, simple hand tools, and widely available existing fastening devices including nails, screws, bolts and nuts, and rivets.

BRIEF SUMMARY OF THE INVENTION

This invention, useful for rapid, on-site design, fabrication, and installation of mounting brackets and straps requires only this invention, simple hand tools, and existing fastening devices in the form of at least one of nails, screws, bolts and nuts, or rivets.

The invention consists of a perforated strip of metal. The length of the strip is substantially greater than the width of the strip, and the width of the strip is substantially greater than the thickness of the strip. The strip has longitudinal edges that are substantially straight and parallel to each other. The strip is manufactured in any length desired.

The strip, regardless of its length, is perforated end to end by multiple, longitudinally aligned rows of holes. These rows of holes are substantially straight. They are substantially parallel to each other, and they are substantially parallel to the longitudinal edges of the strip. One of these rows of holes lies at or near the center of the strip. The holes in this row have centers that lie approximately on the central longitudinal axis of the strip. The holes in this row are closely spaced apart longitudinally. Center to center distances between adjacent holes in the row are substantially the same along the length of the row. These holes are called mounting/splicing holes.

The other longitudinally aligned rows of holes lie approximately on longitudinal lines parallel to the central longitudinal axis of the strip. The longitudinal lines on which these rows of holes lie are parallel to each other and are substantially parallel to the longitudinal edges of the strip. The holes within each of these rows have centers that lie approximately on the longitudinal line along which the row is aligned. The holes within each of these rows have centers that are spaced apart longitudinally so that center to center distances between adjacent holes within the row are substantially the same along the length of the row. The center to center distances between adjacent holes within any of these rows of holes is substantially the same as center to center distances between adjacent holes within any of the other of these rows of holes. The center to center distances between adjacent holes in these rows of holes may or may not be substantially the same as center to center distances between adjacent holes in the row of mounting/splicing holes. There is at least one of these rows of holes between the central row of mounting/splicing holes and each longitudinal edge of the strip. The holes in these rows of holes are called breakaway/adjustment holes.

The rows of breakaway/adjustment holes are aligned longitudinally so that a line perpendicular to the length of the strip, said line passing thru the center of a breakaway/adjustment hole in any of the rows, also passes approximately thru the center of a corresponding breakaway/adjustment hole in each of the other longitudinal rows of breakaway/adjustment holes.

Wherever breakaway/adjustment holes are so aligned along a line perpendicular to the length of the strip, there also exists a mounting/splicing hole with a center lying approximately on said line, with at least one breakaway/adjustment hole lying between the mounting/splicing hole and each longitudinal edge of the strip. Such a line, perpendicular to the length of the strip, passing approximately thru the center of a mounting/splicing hole and the centers of breakaway/adjustment holes with which the mounting/splicing hole is perpendicularly aligned, is called a breakaway/adjustment line.

Since breakaway/adjustment lines pass approximately thru the centers of a row of holes perpendicularly aligned to the length of the strip, the cross-sectional area of the strip is significantly less along a breakaway/adjustment line than between breakaway/adjustment lines, making the strip easier to bend along breakaway/adjustment lines. Breakaway/adjustment lines are spaced apart longitudinally along the length of the strip. They are correlated with consecutive mounting/splicing holes on a periodic basis. There can be a breakaway/adjustment line correlated with every mounting splicing hole. Alternatively, there can be a breakaway/adjustment line correlated with every second consecutive mounting/splicing hole, or every third, or every fourth, etc. The closer together breakaway/adjustment lines are spaced, the finer control the user has over the size and shape of the brackets and straps fabricated from sections of strip.

The strip shall be constructed of a metal having mechanical properties and proper temper, so that the strip can be sharply bent, at least once, along a breakaway/adjustment line to an angle somewhat exceeding a right angle, without suffering significant weakening from stress fractures. The same metal shall have mechanical properties and proper temper, so that by repeatedly bending the strip back and forth along a breakaway/adjustment line stress fractures will result, allowing a section of strip to be broken off by means of ordinary hand tools, such as pliers.

Once a section of strip has been broken off, the breakaway adjustment lines internal to the section can be used to bend the section of strip into a desired shape. By utilizing these breakaway/adjustment lines as incremental bending points, it is easy to design and fabricate brackets and straps of desired shape and size, with sharp, well defined internal angles, connected by flat, straight segments of strip.

The mounting/splicing holes are of a size useful for and compatible with existing fastening devices in the form of at least one of nails, screws, bolts and nuts, or rivets.

The mounting/splicing holes provide a means of attaching brackets and straps fabricated from sections of strip to existing supporting structures by means of at least one existing fastening device in the form of at least one of nails, screws, bolts and nuts, or rivets.

The mounting/splicing holes provide a means of attaching multiple sections of strip to one another by means of at least one existing fastening device in the form of at least one of nails, screws, bolts and nuts, or rivets.

The mounting splicing holes provide a means of supporting and securing in place a multitude of items using brackets and straps fabricated from sections of strip by means of at least one existing fastening device in the form of at least one of nails, screws, bolts and nuts, or rivets.

BRIEF DESCRIPTION OF THE SEVERAL VIEWS OF THE DRAWING

FIGS. 1-4 and FIGS. 6-8 illustrate various embodiments of the invention. The rest of the figures and their descriptions are intended to provide some typical examples of how this invention could be used. Any of the various embodiments depicted could be used for these purposes. The examples chosen are not intended to provide a complete, or comprehensive list of all possible applications. The examples chosen are an attempt to demonstrate the versatility of this invention, as well as some of the basic principles of its operation. In the drawings, you will see numerical and alphabetical reference characters, connected by lead lines to various items within the drawings. These reference characters are listed in order, along with their descriptions, in the next section of this application entitled: NUMERICAL/ ALPHABETICAL INDEX OF REFERENCE CHARACTERS. The section of this application entitled DETAILED DESCRIPTION OF THE INVENTION uses the numerical and alphabetical reference characters to relate the text of the description to the appropriate drawing.

Figure 8:
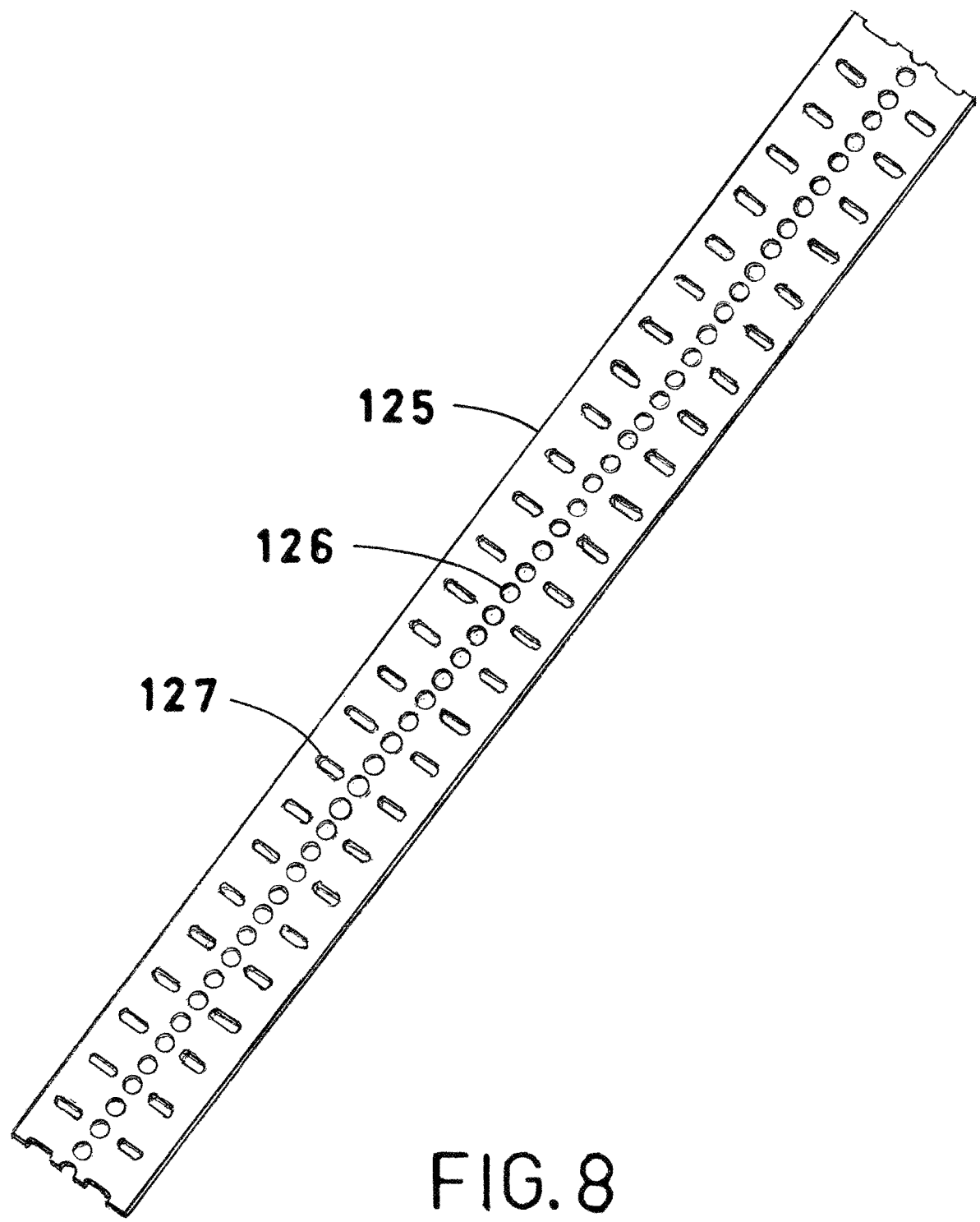

The drawings and their descriptions depict in general form some of the ways this invention could be utilized. The drawings and their descriptions refer generically to the items to be supported as, "cylindrical forms, such as pipes, conduits, or tubes". These items are shown attached to other structures referred to as "sections of plate". A section of plate is considered to be a three dimensional, polyhedral, solid piece of rigid material, such as a section of ceiling, wall, floor, shelf, equipment panel, etc. Its surfaces are substantially flat, and each surface can be said to lie within a plane. The intersections of these planes form edges and corners. The angles of these edges and corners are not necessarily perpendicular. Some drawings show the intersection of two or more sections of plate. Where sections of plate intersect, corners are formed. Once again, these angles are not necessarily perpendicular. If the angle of intersection is more than one hundred eighty degrees, the corner is defined as an "outside" corner. If the angle of intersection is less than one hundred eighty degrees, the corner is defined as an "inside" corner.

FIG. 1 is a top view of a section of strip (101). A row of mounting/splicing holes is shown, the holes being uniformly spaced, and approximately centered on the strip, with (102) representing a typical mounting/splicing hole. Rows of breakaway/adjustment holes, these rows being approximately perpendicular to the length of the strip, are shown by the oblong slots on each side of every other mounting/splicing hole, with (103) representing a typical breakaway/adjustment hole.

FIG. 2 is a top view of a section of strip (104). A row of mounting/splicing holes is shown, the holes being uniformly spaced, and approximately centered on the strip, with (105) representing a typical mounting/splicing hole. Rows of breakaway/adjustment holes, these rows being approximately perpendicular to the length of the strip, are shown by the oblong slots on each side of every mounting/splicing hole, with (106) representing a typical breakaway/adjustment hole.

FIG. 3 is a top view of a section of strip (107). A row of mounting/splicing holes is shown, the holes being uniformly spaced, and approximately centered on the strip, with (108) representing a typical mounting/splicing hole. Rows of breakaway/adjustment holes, these rows being approximately perpendicular to the length of the strip, are shown by the oblong slots on each side of every third mounting/splicing hole, with (109) representing a typical breakaway/adjustment hole.

FIG. 4 is a top view of a section of strip (110). A row of mounting/splicing holes is shown, the holes being uniformly spaced, and approximately centered on the strip, with (111) representing a typical mounting/splicing hole. Rows of breakaway/adjustment holes, these rows being approximately perpendicular to the length of the strip, are shown by the oblong slots on each side of every fourth mounting/splicing hole, with (112) representing a typical breakaway/adjustment hole.

FIG. 5 is a top view of a section of strip (113). A row of mounting/splicing holes is shown, the holes being uniformly spaced, and approximately centered on the strip, with (114) representing a typical mounting/splicing hole. Rows of breakaway/adjustment holes, these rows being approximately perpendicular to the length of the strip, are shown by a variety of shapes, including oblong slots (115), square holes (116), round holes (117), and triangular holes (118). This figure illustrates the fact that the exact shape of the breakaway/adjustment holes is unimportant. Provided they are approximately the same size, and are in line with one another, they are all functionally equivalent.

FIG. 6 is a top view of a section of strip (119). A row of mounting/splicing holes is shown, the holes being uniformly spaced, and approximately centered on the strip, with (120) representing a typical mounting/splicing hole. Rows of breakaway/adjustment holes, these rows being approximately perpendicular to the length of the strip, are shown by pairs of oblong slots on each side of every other mounting/splicing hole, with (121) representing a typical breakaway/adjustment hole.

FIG. 7 is a top view of a section of strip (122). A row of mounting/splicing holes is shown, the holes being uniformly spaced, and approximately centered on the strip, with (123) representing a typical mounting/splicing hole. In this figure, the mounting/splicing holes are square instead of round. A screw will thread into a square hole, if the screw and the square hole are compatible in size. Also, the square holes could be sized to match standard trade sizes of carriage bolts. Rows of breakaway/adjustment holes, these rows being approximately perpendicular to the length of the strip, are shown by the oblong slots on each side of every other mounting/splicing hole, with (124) representing a typical breakaway/adjustment hole.

FIG. 8 is an isometric view of a section of strip (125). This section of strip is similar to the section of strip (101) shown in FIG. 1. A row of mounting/splicing holes is shown, the holes being uniformly spaced, and approximately centered on the strip, with (126) representing a typical mounting/splicing hole. Rows of breakaway/adjustment holes, these rows being approximately perpendicular to the length of the strip, are shown by the oblong slots on each side of every other mounting/splicing hole, with (127) representing a typical breakaway/adjustment hole. This is the embodiment of the invention which is used in FIGS. 12, 13, 14, 15, 16, and 17.

FIG. 9 is a side view. It shows one form in which the invention could be presented. It could be produced in the form of flat strips, which are then compiled into stacks (128).

FIG. 10 is a side view. It shows how the invention could be presented in another form. It shows a bulk roll (129) of strip which has been incrementally bent along certain breakaway adjustment lines.

FIG. 11 is a side view. It shows another variation. It shows a bulk roll (130) of strip which has been formed into an approximately circular, spiral roll.

FIG. 12 is an isometric view of a piece of strip (133) that has been fabricated into a mounting strap for a cylindrical form (132), such as a pipe, conduit, or tube, that needs to be attached to a flat, or plane surface. A section of plate (131) provides such a surface. It could be a section of ceiling, wall, floor, shelf, equipment panel, etc. This drawing shows the mounting strap (133), and its attachment screws (134, 135), in exploded form.

FIG. 13 is an isometric view of the items described in FIG. 12 in their final, fully assembled form.

Figure 14:
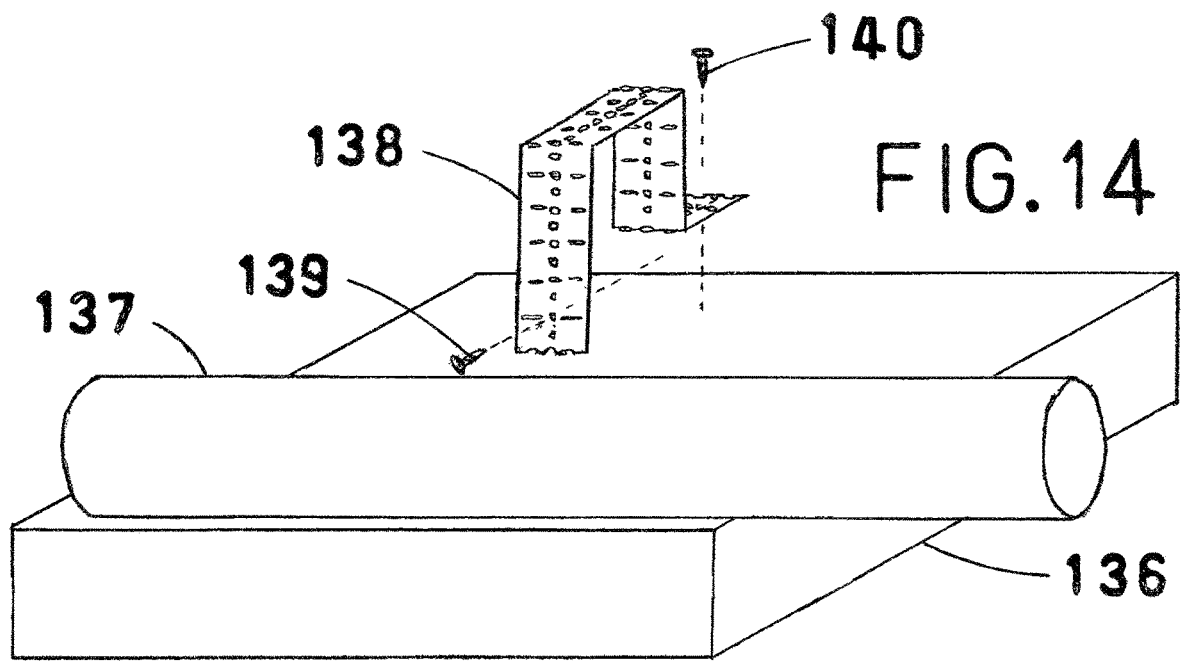

FIG. 14 is an isometric view of a piece of strip (138) that has been fabricated into a mounting strap for a cylindrical form (137), such as a pipe, conduit, or tube, that needs to be attached along the line where two planes intersect, in other words, a corner. A section of plate (136) provides such a corner. In this case, an outside corner. It is important to note that not all corners are perpendicular. That is no obstacle for this invention, however, due to its ability to be bent somewhat beyond ninety degrees, into almost any desired shape. This drawing shows the mounting strap (138), and its attachment screws (139, 140), in exploded form.

Figure 15:
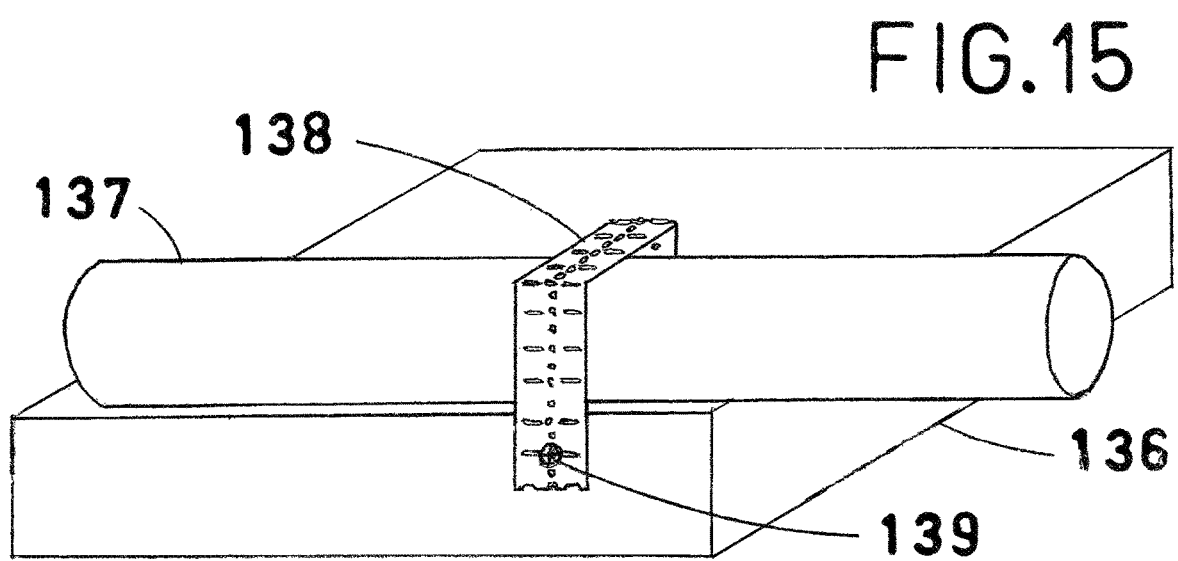

FIG. 15 is an isometric view of the items described in FIG. 14 in their final, fully assembled form.

FIG. 16 is an isometric view that illustrates two ways this invention could be used to strap a cylindrical form (142), such as a pipe, conduit, or tube, into an inside corner. Such a corner is provided by a structure (141), where two sections of plate intersect at an angle. This angle may or may not be perpendicular. This presents no problem, however, because this invention can be bent somewhat beyond ninety degrees, to almost any desired angle. A piece of strip (143) has been fabricated into a mounting strap, bent in the middle, to an angle that approximates the angle of the intersecting planes that form the corner. Another piece of strip (144) has been fabricated into a mounting strap that is straight in the middle, but diagonal to the corner. This drawing shows the mounting straps (143,144), and their attachment screws (145, 146, 147, 148), in exploded form.

FIG. 17 is an isometric view of the items described in FIG. 16 in their final, fully assembled form.

FIG. 18 is a sectional end view of a cylindrical form (150), such as a pipe, conduit, or tube, that needs to be attached to a plane, or flat surface. A section of plate (149) provides such a surface. This drawing shows the mounting strap (151), and its attachment screws (152, 153), in exploded form.

FIG. 19 is a sectional end view of the items described in FIG. 18 in their final, fully assembled form.

FIG. 20 is a sectional end view of a cylindrical form (155), such as a pipe, conduit, or tube, that needs to be attached along the line where two planes intersect, in other words, a corner. A section of plate (154) provides such a corner. In this case, an outside corner. It is important to note that not all corners are perpendicular. That is no obstacle for this invention, however, due to its ability to be bent somewhat beyond ninety degrees, into almost any desired shape. This drawing shows the mounting strap (156), and its attachment screws (157, 158), in exploded form.

FIG. 21 is a sectional end view of the items described in FIG. 20 in their final, fully assembled form.

Figure 22:
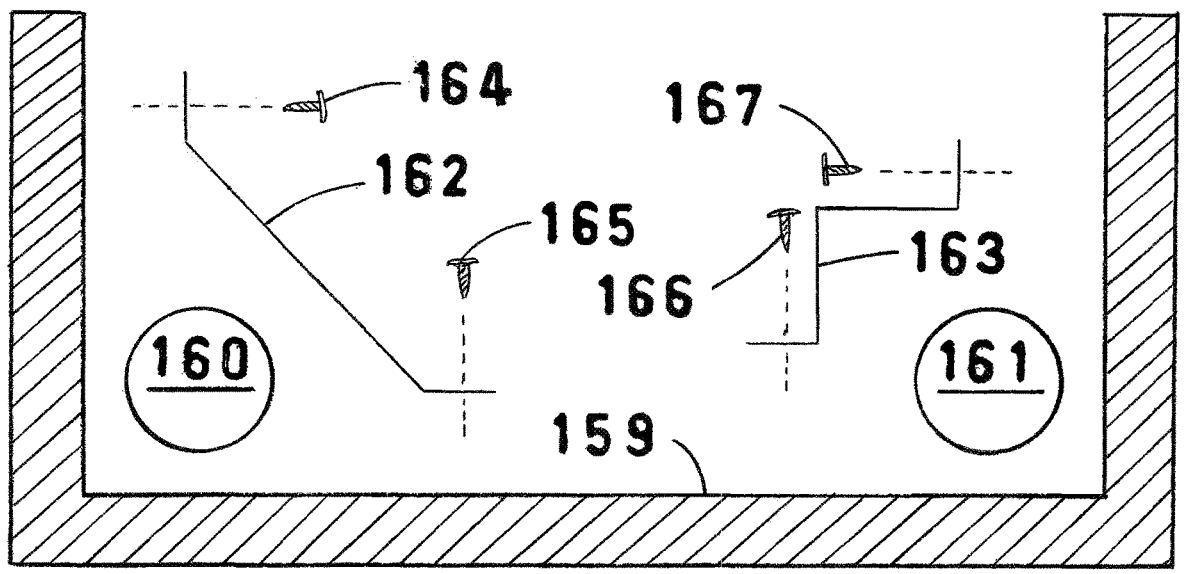

FIG. 22 is a sectional end view of a structure (159), where a section of plate in one plane is intersected by two other sections of plate, each in a separate plane, thereby providing two inside corners. The angles of these corners are not necessarily perpendicular. That is no obstacle for this invention, however, due to its ability to be bent somewhat beyond ninety degrees, to almost any desired angle. There are two cylindrical forms (160, 161), such as pipes, conduits, or tubes, that need to be supported by the structure (159). This drawing shows two different ways that this invention could be used to strap such a cylindrical form into an inside corner. A piece of strip (162) has been fabricated into a mounting strap that is straight in the middle, but diagonal to the corner. Another piece of strip (163) has been fabricated into a mounting strap, bent in the middle, to an angle approximating the angle of the intersecting planes that form the corner. This drawing shows the mounting straps (162,163), and their attaching screws (164,165,166, 167), in exploded form.

Figure 23:
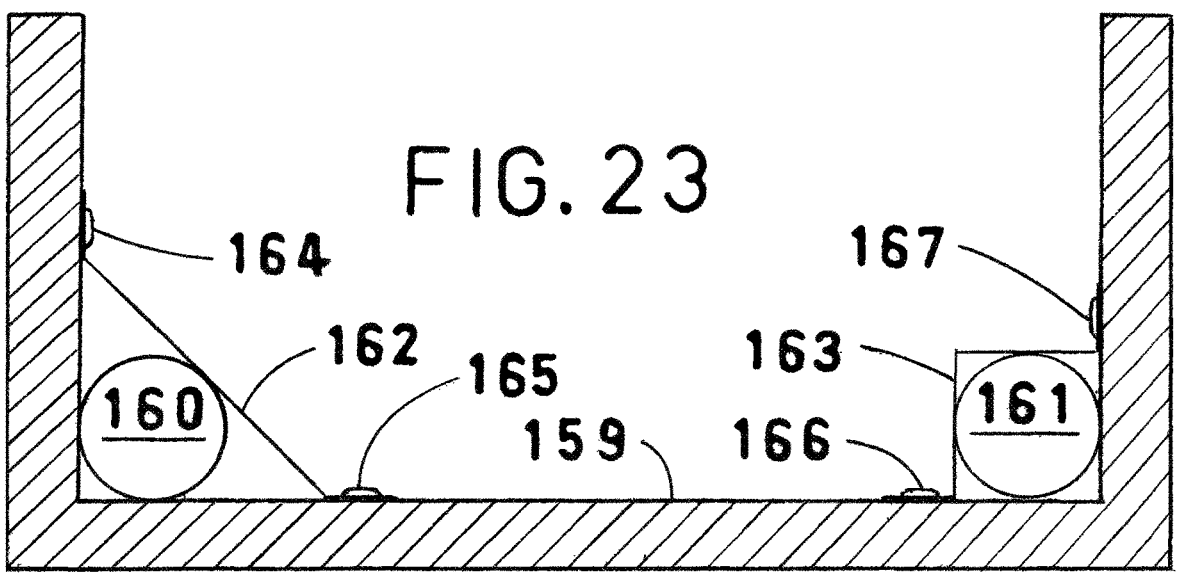

FIG. 23 is a sectional end view of the items described in FIG. 22 in their final, fully assembled form.

Figure 24:
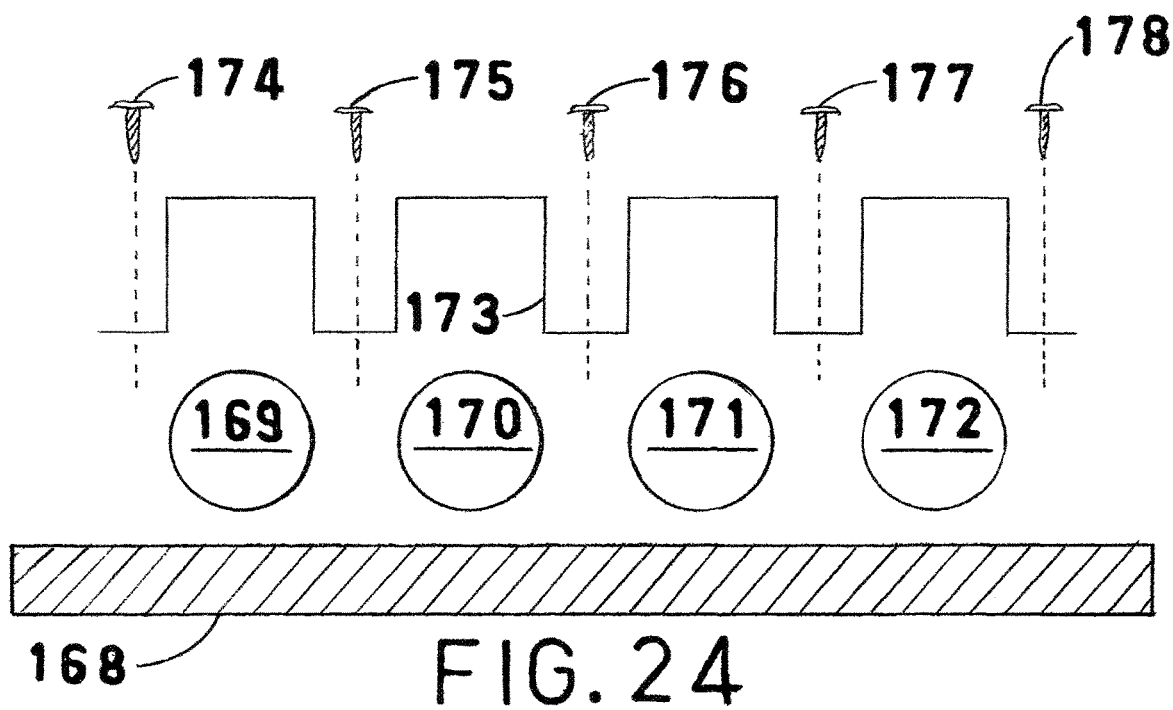

FIG. 24 is a sectional end view of four cylindrical forms (169,170,171, 172), such as pipes, conduits, or tubes, that need to be attached to a flat, or plane surface. Such a surface is provided by a section of plate (168). A piece of strip (173) has been fabricated into a mounting strap designed to secure the cylindrical forms to the plate. This drawing shows the mounting strap (173), and its attaching screws (174,175, 176,177, 178), in exploded form.

Figure 25:
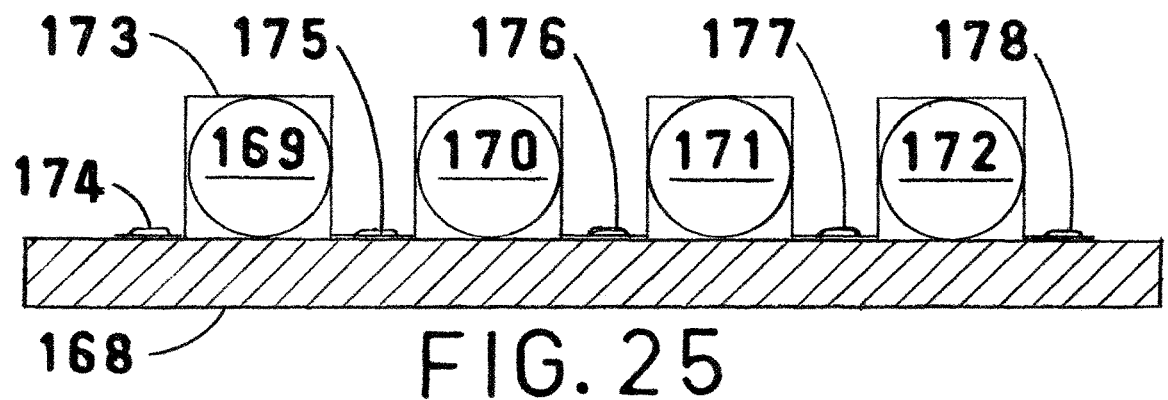

FIG. 25 is a sectional end view of the items described in FIG. 24 in their final, fully assembled form.

FIG. 26 is a sectional end view that demonstrates the use of this invention both as a mounting strap, and as a mounting bracket. A section of plate (179) has two cylindrical forms (180, 181), such as pipes, conduits, or tubes, attached to one of its surfaces, using conventional one hole straps (182, 183), and their attaching screws (184, 185). Their presence precludes the possibility of attaching additional pipes, conduits, or tubes to that surface of the plate. A piece of strip (186) has been fabricated into a mounting bracket designed to bridge over items 180 and 181. It, and its attachment screws (187, 188), are shown in exploded form. Two cylindrical forms (189, 190), such as pipes, conduits, or tubes, along with their mounting straps (191, 192), and their attachment screws (193,194, 195), are shown in exploded form above the bracket (186). Note that strap (191) is made of a strip of this invention, while strap (192) is a conventional one hole strap. Brackets made of this invention are compatible not only with straps made of this invention, but also with a variety of conventional straps, and other devices.

FIG. 27 is a sectional end view of the items described in FIG. 26 in their final, fully assembled form.

FIG. 28 is a sectional end view of the final assembly described in FIG. 27. Shown above the assembly, in exploded form, is another bracket (196), two additional cylindrical forms (199, 200), such as pipes, conduits, or tubes, their mounting brackets (201, 202), and attachment screws (197,198,203,204, 205).

Figure 29:
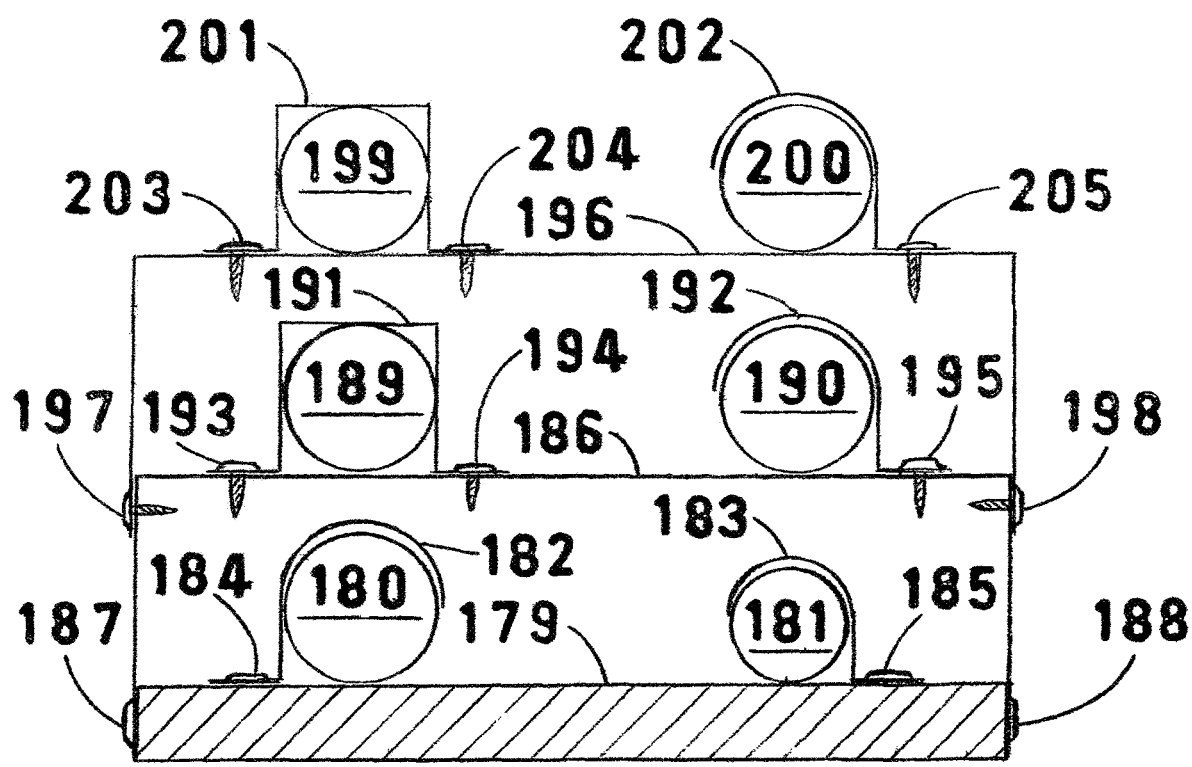

FIG. 29 is a sectional end view of the items described in FIG. 28 in their final, fully assembled form. Note that, once again, a conventional one hole strap has been attached to a bracket made from this invention.

Figure 30:
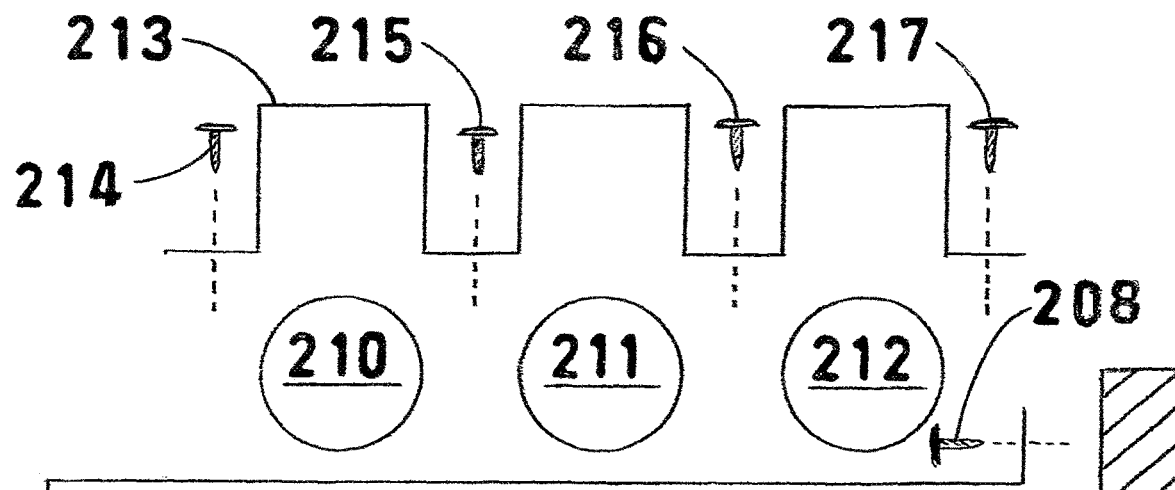

FIG. 30 is a sectional end view of three cylindrical forms (210,211, 212), such as pipes, conduits, or tubes, to be supported by a bracket (207) fabricated from a strip of this invention. The bracket is to be attached to a flat, or plane surface, provided by a section of plate (206). A mounting strap (213) has been fabricated from a strip of this invention. All of these items, as well as their attachment screws (208,209,214,215,216, 217), are shown in exploded form.

Figure 31:
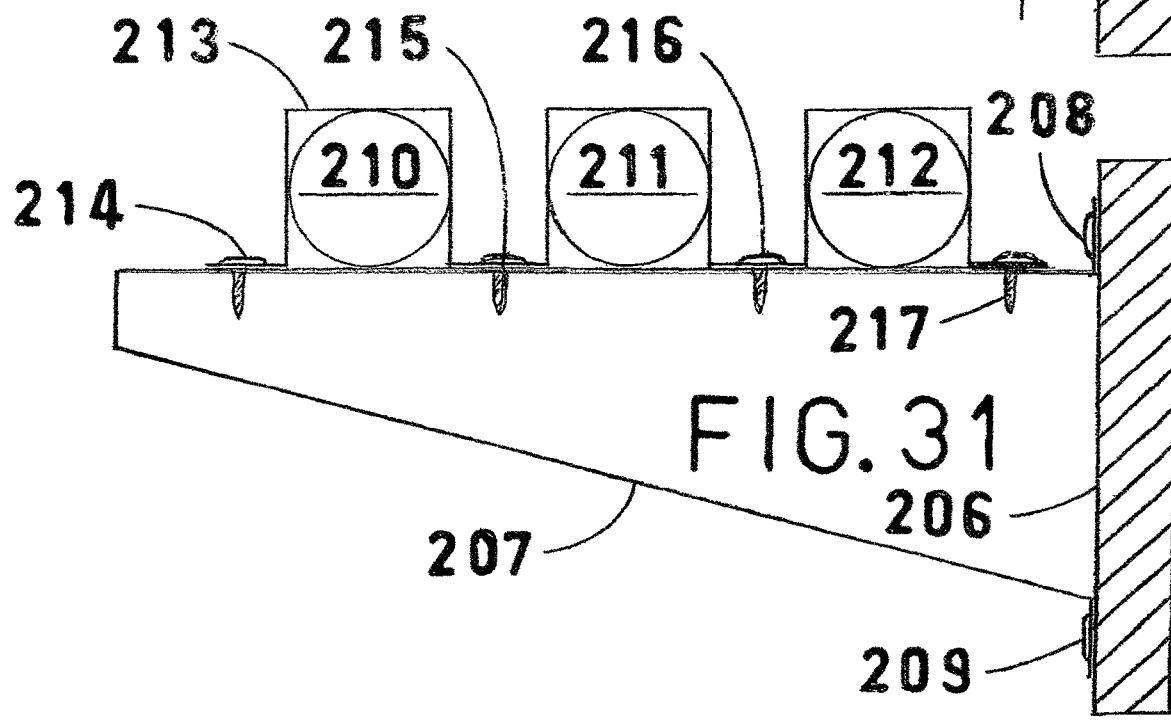

FIG. 31 is a sectional end view of the items described in FIG. 30 in their final, fully assembled form.

FIG. 32 is a sectional end view of two mounting brackets (219, 220) fabricated from strips of the invention. The brackets are mounted by means of attachment screws (221, 222, 223, 224) to a flat, or plane surface, provided by a section of plate (218). The strips used to fabricate the brackets are equal in length. Bracket 219 has been fabricated using ninety degree angles. The height of this bracket is represented by H1. Bracket 220 has been fabricated so that the sides are sloped. The height of this bracket is represented by H2. The difference between H1 and H2 is represented by R, which stands for the range of adjustment attainable by varying the slope of the sides of bracket 220. By choosing a strip of the correct length, and bending the angles properly, it is possible to fabricate a mounting bracket of any desired height.

FIG. 33 is a sectional end view of a cylindrical form (226), such as a pipe, conduit, or tube, which needs to be supported at a certain specified height (H3), from a flat, or plane surface, provided by a section of plate (225).

FIG. 34 is a sectional end view of items 225 and 226, as described for FIG. 33. Also shown, is a mounting bracket (227) fabricated from a strip of the invention, along with its attachment screws (228, 229). In addition, there is a mounting strap (230) fabricated from a strip of the invention, along with its attachment screws (231, 232). The mounting bracket (227) has been fabricated so that its height matches H3, by adjusting the slope of the sides.

NUMERICAL/ALPHABETICAL INDEX OF REFERENCE CHARACTERS

101: typical section of strip
102: typical mounting/splicing hole

103: typical breakaway/adjustment hole
104: typical section of strip
105: typical mounting/splicing hole
106: typical breakaway/adjustment hole
107: typical section of strip
108: typical mounting/splicing hole
109: typical breakaway/adjustment hole
110: typical section of strip
111: typical mounting/splicing hole
112: typical breakaway/adjustment hole
113: typical section of strip
114: typical mounting/splicing hole
115: typical breakaway/adjustment hole, in the form of an oblong slot
116: typical breakaway/adjustment hole, in the form of a square hole
117: typical breakaway/adjustment hole, in the form of a round hole
118: typical breakaway/adjustment hole, in the form of a triangular hole
119: typical section of strip
120: typical mounting/splicing hole
121: typical breakaway/adjustment hole
122: typical section of strip
123: typical mounting/splicing hole, in the form of a square hole
124: typical breakaway/adjustment hole
125: typical section of strip
126: typical mounting/splicing hole
127: typical breakaway/adjustment hole
128: the invention presented as a stack of strips
129: the invention presented as a bulk roll of strip, which has been incrementally bent at certain breakaway/adjustment holes
130: the invention presented as a bulk roll of strip, which has been formed into an approximately circular, spiral roll
131: a section of plate providing a flat, or plane surface
132: a cylindrical form such as a pipe, conduit, or tube
133: a piece of strip that has been fabricated into a mounting strap for securing item 132 to a flat, or plane surface
134: attachment screw
135: attachment screw
136: a section of plate providing an outside corner, not necessarily ninety degrees
137: a cylindrical form, such as a pipe, conduit, or tube
138: a piece of strip that has been fabricated into a mounting strap for securing item 137 to an outside corner, not necessarily ninety degrees
139: attachment screw
140: attachment screw
141: a structure where two sections of plate intersect at an angle, providing an inside corner. The angle is not necessarily ninety degrees.
142: a cylindrical form, such as a pipe, conduit, or tube
143: a piece of strip that has been fabricated into a mounting strap for item 142, by bending the strap in the middle to an angle that approximates the angle of the intersecting planes that form the corner.
144: a piece of strip that has been fabricated into a mounting strap for item 142, by means of a straight, diagonal line
145: attachment screw
146: attachment screw
147: attachment screw
148: attachment screw
149: a section of plate providing a flat, or plane surface
150: a cylindrical form, such as a pipe, conduit, or tube
151: a piece of strip that has been fabricated into a mounting strap for securing item 150 to a flat, or plane surface
152: attachment screw
153: attachment screw
154: a section of plate providing an outside corner, not necessarily ninety degrees
155: a cylindrical form, such as a pipe, conduit, or tube
156: a piece of strip that has been fabricated into a mounting strap for securing item 155 to an outside corner. The corner may or may not be a ninety degree angle.
157: attachment screw
158: attachment screw
159: a structure where a section of plate in one plane is intersected by two other sections of plate, each in a separate plane, thereby providing two inside corners. The angles of these corners are not necessarily perpendicular.
160: a cylindrical form, such as a pipe, conduit, or tube
161: a cylindrical form, such as a pipe, conduit, or tube
162: a piece of strip that has been fabricated into a mounting strap, for securing item 160 into an inside corner
163: a piece of strip that has been fabricated into a mounting strap, for securing item 161 into an inside corner
164: attachment screw
165: attachment screw
166: attachment screw
167: attachment screw
168: a section of plate providing a flat, or plane surface
169: a cylindrical form, such as a pipe, conduit, or tube
170: a cylindrical form, such as a pipe, conduit, or tube
171: a cylindrical form, such as a pipe, conduit, or tube
172: a cylindrical form, such as a pipe, conduit, or tube
173: a piece of strip that has been fabricated into a mounting strap, for securing items
169,170,171, and 172 to a flat, or plane surface
174: attachment screw
175: attachment screw
176: attachment screw
177: attachment screw
178: attachment screw
179: a section of plate providing a flat, or plane surface
180: a cylindrical form, such as a pipe, conduit, or tube
181: a cylindrical form, such as a pipe, conduit, or tube
182: a conventional one hole strap
183: a conventional one hole strap
184: attachment screw
185: attachment screw
186: a piece of strip that has been fabricated into a mounting bracket designed to bridge across items 180 and 181
187: attachment screw
188: attachment screw
189: a cylindrical form, such as a pipe, conduit, or tube
190: a cylindrical form, such as a pipe, conduit, or tube
191: a piece of strip that has been fabricated into a mounting strap for securing item 189 to bracket 186
192: a conventional one hole strap
193: attachment screw
194: attachment screw
195: attachment screw
196: a piece of strip that has been fabricated into a mounting bracket designed to bridge over items 189 and 190
197: attachment screw
198: attachment screw
199: a cylindrical form, such as a pipe, conduit, or tube
200: a cylindrical form, such as a pipe, conduit, or tube
201: a piece of strip that has been fabricated into a mounting strap for securing item 199 to bracket 196
202: a conventional one hole strap 203: attachment screw
204: attachment screw
205: attachment screw
206: a section of plate providing a flat, or plane surface
207: a piece of strip that has been fabricated into a mounting bracket designed to support items 210, 211, and 212
208: attachment screw
209: attachment screw
210: a cylindrical form, such as a pipe, conduit, or tube
211: a cylindrical form, such as a pipe, conduit, or tube
212: a cylindrical form, such as a pipe, conduit, or tube
213: a piece of strip that has been fabricated into a mounting strap for securing items 210, 211, and 212 to bracket 207
214: attachment screw
215: attachment screw
216: attachment screw
217: attachment screw
218; a section of plate providing a flat, or plane surface
219: a piece of strip that has been fabricated into a mounting bracket using ninety degree angles, resulting in a height of H1
220: a piece of strip that has been fabricated into a mounting bracket with sloping sides, resulting in a height of H2
221: attachment screw
222: attachment screw
223: attachment screw
224: attachment screw
225: a section of plate providing a flat, or plane surface
226: a cylindrical form, such as a pipe, conduit, or tube
227: a piece of strip that has been fabricated into a mounting bracket of a specified height (H3), by means of adjusting the slope of the sides
228: attachment screw
229: attachment screw
230: a piece of strip that has been fabricated into a mounting strap, for securing item 226 to bracket 227
231: attachment screw
232: attachment screw
H1: height of mounting bracket 219
H2: height of mounting bracket 220
H3: height of mounting bracket 227
R: range of adjustment for height of a mounting bracket, based on the slope of its sides

DETAILED DESCRIPTION OF THE INVENTION

This invention, useful for rapid, on-site design, fabrication, and installation of mounting brackets and straps requires only this invention, simple hand tools, and existing fastening devices in the form of at least one of nails, screws, bolts and nuts, or rivets.

The invention consists of a perforated strip of metal. The length of the strip is substantially greater than the width of the strip, and the width of the strip is substantially greater than the thickness of the strip. The strip has longitudinal edges that are substantially straight and parallel to each other. The strip is manufactured in any length desired.

Refer to FIGS. 1-4 and FIGS. 6-8. These figures depict alternative embodiments of the invention. At first glance they all look different, but the features within each strip are related to each other in ways that are common to all the strips. Each strip, regardless of its length, is perforated end to end by multiple longitudinally aligned rows of holes. The rows are substantially straight. The rows are substantially parallel to each other. The rows are substantially parallel to the longitudinal edges of the strip. One row of holes lies at or near the center of each strip. Refer to FIG. 1. Hole (102) is a typical hole in a central row of holes in strip (101). Refer to FIG. 2. Hole (105) is a typical hole in a central row of holes in strip (104). Refer to FIG. 3. Hole (108) is a typical hole in a central row of holes in strip (107). Refer to FIG. 4. Hole (111) is a typical hole in a central row of holes in strip (110). Refer to FIG. 6. Hole (120) is a typical hole in a central row of holes in strip (119). Refer to FIG. 7. Hole (123) is a typical hole in a central row of holes in strip (122). Refer to FIG. 8. Hole (126) is a typical hole in a central row of holes in strip (125).

The holes in the central row in each strip have centers that lie approximately on the central longitudinal axis of the strip. The holes in the central row in each strip are closely spaced apart longitudinally. Center to center distances between adjacent holes in each central row are substantially the same along the length of the row. The holes can be spaced as close to each other as desired, the only limit being that they are not so close as to seriously weaken the mechanical integrity of the strip along its central longitudinal axis. These holes are called mounting/splicing holes.

The mounting/splicing holes are of a size useful for and compatible with existing fastening devices in the form of at least one of nails, screws, bolts and nuts, or rivets. An existing fastening device can utilize a mounting/splicing hole in one of two ways. A fastening device may have a shaft that slides thru the hole, but a head that does not. Examples of such fasteners are nails, screws, bolts and nuts, and rivets. The other way a fastening device can utilize a mounting/splicing hole is by having threads that grip the metal of the strip by cutting threads into the perimeter of the mounting splicing hole. Examples of such fasteners are self-tapping screws and self-drilling screws. Mounting/splicing holes should normally be round, but they don't have to be. FIG. 7 depicts mounting/splicing holes that are square. A square hole could still be utilized in both ways as described above. A square hole would be ideal for use with carriage bolts, for example. Other shapes could be used as well.

The mounting/splicing holes provide a means of attaching brackets and straps fabricated from sections of strip to existing supporting structures by means of at least one existing fastening device in the form of at least one of nails, screws, bolts and nuts, or rivets.

The mounting/splicing holes provide a means of attaching multiple sections of strip to one another by means of at least one existing fastening device in the form of at least one of nails, screws, bolts and nuts, or rivets.

The mounting splicing holes provide a means of supporting and securing in place a multitude of items using brackets and straps fabricated from sections of strip by means of at least one existing fastening device in the form of at least one of nails, screws, bolts and nuts, or rivets.

Refer to FIGS. 1-4 and FIGS. 6-8. Within each strip, the other longitudinally aligned rows of holes are substantially straight. The rows are substantially parallel to the row of mounting/splicing holes. The rows are substantially parallel to each other. The rows are substantially parallel to the edges of the strip. The rows lie approximately on longitudinal lines parallel to the central longitudinal axis of the strip. The longitudinal lines on which the rows of holes lie are parallel to each other and are substantially parallel to the longitudinal edges of the strip. The holes within each row have centers that lie approximately on the longitudinal line along which the row is aligned. The holes within each row have centers that are spaced apart longitudinally. Center to center distances between adjacent holes within each row are substantially the same along the length of the row.

Within each strip, with the possible exception of the row of mounting/splicing holes, center to center distances between adjacent holes within any row are substantially the same as center to center distances between adjacent holes within any other row. Center to center distances between adjacent holes in these rows may or may not be substantially the same as center to center distances between adjacent holes in the row of mounting/splicing holes. There is at least one of these rows of holes between the central row of mounting/splicing holes and each longitudinal edge of the strip. The holes in these rows of holes are called breakaway/adjustment holes.

Refer to FIG. 1. Hole (103) is a typical breakaway/adjustment hole in strip (101). Refer to FIG. 2. Hole (106) is a typical breakaway/adjustment hole in strip (104). Refer to FIG. 3. Hole (109) is a typical breakaway/adjustment hole in strip (107). Refer to FIG. 4. Hole (112) is a typical breakaway/adjustment hole in strip (110). Refer to FIG. 6. Hole (121) is a typical breakaway/adjustment hole in strip (119). Refer to FIG. 7. Hole (124) is a typical breakaway/adjustment hole in strip (122). Refer to FIG. 8. Hole (127) is a typical breakaway/adjustment hole in strip (125).

Refer to FIG. 5, holes (115, 116, 117, and 118). FIG. 5 is not intended to depict a form in which the invention would be manufactured. It is included to illustrate the fact that breakaway/adjustment holes could come in a variety of shapes. Hole (115) depicts a breakaway/adjustment hole that is somewhat elongated in a direction perpendicular to the length of the strip. This would normally be the preferred shape of a breakaway/adjustment hole.

Within each strip, the longitudinal rows of breakaway/adjustment holes are aligned with each other longitudinally so that a line perpendicular to the length of the strip, said line passing thru the center of a breakaway/adjustment hole in any of the rows also passes approximately thru the center of a corresponding breakaway/adjustment hole in each of the other rows. To be perfectly clear, the breakaway/adjustment holes within each strip have centers that are aligned with each other both longitudinally and perpendicularly.

Within each strip, wherever breakaway/adjustment holes have centers that are approximately aligned along a line perpendicular to the length of the strip, there also exists a mounting/splicing hole with a center lying approximately on said line, with at least one breakaway/adjustment hole lying between the mounting/splicing hole and each longitudinal edge of the strip. Such a line, perpendicular to the length of the strip, passing approximately thru the center of a mounting/splicing hole and the centers of breakaway/adjustment holes with which the mounting/splicing hole is perpendicularly aligned, is called a breakaway/adjustment line. Since breakaway/adjustment lines pass approximately thru the centers of a row of holes perpendicularly aligned to the length of the strip, the cross-sectional area of the strip is significantly less along a breakaway/adjustment line than between breakaway/adjustment lines, making the strip easier to bend along breakaway/adjustment lines.

Within each strip, breakaway/adjustment lines are uniformly spaced apart longitudinally along the length of the strip. The breakaway/adjustment lines are correlated with consecutive mounting/splicing holes on a periodic basis. Refer to FIG. 2. FIG. 2 depicts a strip wherein every mounting splicing hole is correlated with a breakaway/adjustment line. Refer to FIG. 1. FIG. 1 depicts a strip wherein every second mounting/splicing hole is correlated with a breakaway/adjustment line. Refer to FIG. 3. FIG. 3 depicts a strip wherein every third mounting/splicing hole is correlated with a breakaway/adjustment line. Refer to FIG. 4. FIG. 4 depicts a strip wherein every fourth mounting/splicing hole is correlated with a breakaway/adjustment line. The closer together breakaway/adjustment lines are spaced, the finer control the user has over the size and shape of the brackets and straps fabricated from sections of strip.

The strip shall be constructed of a metal having mechanical properties and proper temper, so that the strip can be sharply bent, at least once, along a breakaway/adjustment line to an angle somewhat exceeding a right angle, without suffering significant weakening from stress fractures. The same metal shall have mechanical properties and proper temper, so that by repeatedly bending the strip back and forth along a breakaway/adjustment line stress fractures will result, allowing a section of strip to be broken off by means of ordinary hand tools, such as pliers.

Once a section of strip has been broken off, the breakaway adjustment lines internal to the section can be used to bend the section of strip into a desired shape. By utilizing these breakaway/adjustment lines as incremental bending points, it is easy to design and fabricate brackets and straps of desired shape and size, with sharp, well defined internal angles, connected by flat, straight segments of strip.

The mounting/splicing holes are of a size useful for and compatible with existing fastening devices in the form of at least one of nails, screws, bolts and nuts, or rivets.

The mounting/splicing holes provide a means of attaching brackets and straps fabricated from sections of strip to existing supporting structures by means of at least one existing fastening device in the form of at least one of nails, screws, bolts and nuts, or rivets.

The mounting/splicing holes provide a means of attaching multiple sections of strip to one another by means of at least one existing fastening device in the form of at least one of nails, screws, bolts and nuts, or rivets.

The mounting splicing holes provide a means of supporting and securing in place a multitude of items using brackets and straps fabricated from sections of strip by means of at least one existing fastening device in the form of at least one of nails, screws, bolts and nuts, or rivets.

FIG. 9 is a side view. It shows one form in which the invention could be presented. It could be produced in the form of flat strips, which are then compiled into stacks (128).

FIG. 10 is a side view. It shows how the invention could be presented in another form. It shows a bulk roll (129) of strip which has been incrementally bent along certain breakaway adjustment lines.

FIG. 11 is a side view. It shows another variation. It shows a bulk roll (130) of strip which has been formed into an approximately circular, spiral roll.

FIGS. 12-34 depict some typical ways the invention could be utilized.

What is claimed is:

1. An invention, useful for rapid, on-site design, fabrication, and installation of mounting brackets and straps, requiring only the invention, simple hand tools, and existing fastening devices in the form of at least one of nails, screws, bolts and nuts, or rivets, the invention consisting of a perforated strip of metal, a length of the strip being substantially greater than a width of the strip, the width of the strip being substantially greater than a thickness of the strip, the strip having a first longitudinal edge and a second longitudinal edge, with the longitudinal edges being substantially straight and parallel, the strip being manufactured in the length, the strip being longitudinally perforated end to end by three rows of holes, the three rows of holes being substantially straight, the three rows of holes being substantially parallel to each other, the three rows of holes being substantially parallel with the first and second longitudinal edges of the strip, with a first of the three rows of holes lying approximately on a central longitudinal axis of the strip, the holes in the first row having centers that lie approximately on the central longitudinal axis of the strip, the holes being closely spaced apart longitudinally, with center to center distances between adjacent holes within the first row being substantially the same along a length of the first row, a width of the holes being substantially less than the width of the strip, and substantially greater than the thickness of the strip, the holes in the first row hereinafter called mounting/splicing holes, with a second of the three rows of holes lying approximately along a first longitudinal line parallel to the central longitudinal axis, the first longitudinal line being straight and substantially parallel with the longitudinal edges of the strip, the first longitudinal line lying approximately halfway between the central longitudinal axis of the strip and the first longitudinal edge of the strip, the holes in the second row having centers that lie approximately on the first longitudinal line, the holes being spaced apart longitudinally, with center to center distances between adjacent holes within the second row being substantially the same along a length of the second row, a width of the holes being substantially less than the width of the strip, and substantially greater than the thickness of the strip, the holes in the second row hereinafter called breakaway/adjustment holes, the second row of holes lying along the first longitudinal line being a first of two rows of breakaway/adjustment holes, with a third of the three rows of holes lying approximately along a second longitudinal line parallel to the central longitudinal axis, the second longitudinal line being straight and parallel to the first longitudinal line, the second longitudinal line being substantially parallel with the longitudinal edges of the strip, the second longitudinal line lying approximately halfway between the central longitudinal axis of the strip and the second longitudinal edge of the strip, the holes in the third row having centers that lie approximately on the second longitudinal line, the holes being spaced apart longitudinally, with center to center distances between adjacent holes within the third row being substantially the same along a length of the third row, a width of the holes being substantially less than the width of the strip, and substantially greater than the thickness of the strip, the holes in the third row hereinafter called breakaway/adjustment holes, the third row of holes lying along the second longitudinal line being a second of the two rows of breakaway/adjustment holes, with the first row of breakaway/adjustment holes lying approximately halfway between the row of mounting/splicing holes and the first longitudinal edge of the strip, and the second row of breakaway/adjustment holes lying approximately halfway between the row of mounting/splicing holes and the second longitudinal edge of the strip, with the center to center spacing of adjacent breakaway/adjustment holes in the first row of breakaway/adjustment holes being substantially the same as the center to center spacing of adjacent breakaway/adjustment holes in the second row of breakaway/adjustment holes, with the first and second rows of breakaway/adjustment holes being longitudinally aligned so that a line perpendicular to the central longitudinal axis, said line passing thru the center of one of the breakaway/adjustment holes in the first row of breakaway/adjustment holes, also passes approximately thru the center of a corresponding one of the breakaway/adjustment holes in the second row of breakaway/adjustment holes, with the center to center spacing of consecutive mounting/splicing holes being correlated with the center to center spacing of consecutive breakaway/adjustment holes, so that every mounting/splicing hole is aligned with a pair of the breakaway/adjustment holes, one being between the mounting/splicing hole and the first longitudinal edge, and one being between the mounting/splicing hole and the second longitudinal edge, with the centers of all three respective holes lying approximately on the line perpendicular to the central longitudinal axis of the strip, said line hereinafter called a breakaway/adjustment line, there being the breakaway adjustment line wherever one of the mounting/splicing holes and one of the pair of breakaway/adjustment holes are so aligned, and with the breakaway/adjustment lines passing approximately thru the centers of the mounting/splicing hole and the respective associated pair of breakaway/adjustment holes whereby a cross-sectional area of the strip is considerably less along the breakaway/adjustment line than between breakaway/adjustment lines, making it easier to bend the strip along the breakaway/adjustment line, with the perforated metal strip being composed of the metal having mechanical properties that allow the strip to be sharply bent, at least once, along one of the breakaway/adjustment lines to an angle somewhat exceeding a right angle without suffering significant weakening from stress fractures, while the same mechanical properties of the metal allow that by repeatedly bending the strip back and forth along the breakaway/adjustment line stress fractures will result, thereby allowing a section of strip to be broken off using ordinary hand tools including pliers, whereupon the section of strip, once detached, is configured as a bracket or strap by utilizing the breakaway/adjustment lines within the section of strip as internal, incremental bending points to fabricate a bracket or strap to a desired and easily repeatable shape and size with well defined, sharp internal angles connected by substantially flat segments of strip, the mounting/splicing holes being of a size useful for and compatible with existing fastening devices in the form of at least one of nails, screws, bolts and nuts, or rivets, the mounting/splicing holes providing a means of attaching brackets and straps fabricated from sections of strip to existing supporting structures by means of at least one existing fastening device in the form of at least one of nails, screws, bolts and nuts, or rivets, the mounting/splicing holes providing a means of attaching multiple sections of strip to one another by means of at least one existing fastening device in the form of at least one of nails, screws, bolts and nuts, or rivets, and the mounting/splicing holes providing a means of supporting and securing in place a multitude of items using brackets and straps fabricated from sections of strip by means of at least one existing fastening device in the form of at least one of nails, screws, bolts and nuts, or rivets.

2. An invention, useful for rapid, on-site design, fabrication, and installation of mounting brackets and straps, requiring only the invention, simple hand tools, and existing fastening devices in the form of at least one of nails, screws, bolts and nuts, or rivets, the invention comprising a perforated strip of metal, a length of the strip being substantially greater than a width of the strip, the width of the strip being substantially greater than a thickness of the strip, the strip having a first longitudinal edge and a second longitudinal edge, with the longitudinal edges being substantially straight and parallel, the strip being manufactured in the length, the strip being longitudinally perforated end to end by three rows of holes, the three rows of holes being substantially straight, the three rows of holes being substantially parallel to each other, the three rows of holes being substantially parallel with the first and second longitudinal edges of the strip, with a first of the three rows of holes lying approximately on a central longitudinal axis of the strip, the holes in the first row having centers that lie approximately on the central longitudinal axis of the strip, the holes being closely spaced apart longitudinally with no additional holes being located between the holes, with center to center distances between adjacent holes within the first row being substantially the same along a length of the first row, a width of the holes being substantially less than the width of the strip, and substantially greater than the thickness of the strip, the holes in the first row hereinafter called mounting/splicing holes, with a second of the three rows of holes lying approximately along a first longitudinal line parallel to the central longitudinal axis, the first longitudinal line being straight and substantially parallel with the longitudinal edges of the strip, the first longitudinal line lying approximately halfway between the central longitudinal axis of the strip and the first longitudinal edge of the strip, the holes in the second row having centers that lie approximately on the first longitudinal line, the holes being spaced apart longitudinally with no additional holes being located between the holes, with center to center distances between adjacent holes within the second row being substantially the same along a length of the second row with no additional holes being located between the holes, a width of the holes being substantially less than the width of the strip, and substantially greater than the thickness of the strip, the holes in the second row hereinafter called breakaway/adjustment holes, the second row of holes lying along the first longitudinal line being a first of two rows of breakaway/adjustment holes, with a third of the three rows of holes lying approximately along a second longitudinal line parallel to the central longitudinal axis, the second longitudinal line being straight and parallel to the first longitudinal line, the second longitudinal line being substantially parallel with the longitudinal edges of the strip, the second longitudinal line lying approximately halfway between the central longitudinal axis of the strip and the second longitudinal edge of the strip, the holes in the third row having centers that lie approximately on the second longitudinal line, the holes being spaced apart longitudinally with no additional holes being located between the holes, with center to center distances between adjacent holes within the third row being substantially the same along a length of the third row, a width of the holes being substantially less than the width of the strip, and substantially greater than the thickness of the strip, the holes in the third row hereinafter called breakaway/adjustment holes, the third row of holes lying along the second longitudinal line being a second of the two rows of breakaway/adjustment holes, with the first row of breakaway/adjustment holes lying approximately halfway between the first row of mounting/splicing holes and the first longitudinal edge of the strip, and the second row of breakaway/adjustment holes lying approximately halfway between the first row of mounting/splicing holes and the second longitudinal edge of the strip, with the center to center spacing of adjacent breakaway/adjustment holes in the first row of breakaway/adjustment holes being substantially the same as the center to center spacing of adjacent breakaway/adjustment holes in the second row of breakaway/adjustment holes, with the first and second rows of breakaway/adjustment holes being longitudinally aligned so that a line perpendicular to the central longitudinal axis, said line passing thru the center of one of the breakaway/adjustment holes in the first row of breakaway/adjustment holes, also passes approximately thru the center of a corresponding one of the breakaway/adjustment holes in the second row of breakaway/adjustment holes, with the center to center spacing of consecutive mounting/splicing holes being correlated with the center to center spacing of consecutive breakaway/adjustment holes, so that there is at least one mounting/splicing hole that is not aligned with a pair of breakaway/adjustment holes between each one of the mounting/splicing holes which is aligned with a pair of the breakaway/adjustment holes, one of each of the pair of the breakaway/adjustment holes being between the mounting/splicing hole and the first longitudinal edge, and a second one of each of the pair of the breakaway/adjustment holes being between the mounting/splicing hole and the second longitudinal edge, with the centers of all three holes lying approximately on the line perpendicular to the central longitudinal axis of the strip, said line hereinafter called a breakaway/adjustment line, there being one of the breakaway adjustment lines wherever one of the mounting/splicing holes and the respective pair of breakaway/adjustment holes are so aligned, and with the breakaway/adjustment lines passing approximately thru the centers of the mounting/splicing hole and the respective associated pair of breakaway/adjustment holes, whereby a cross-sectional area of the strip is considerably less along the breakaway/adjustment line than between breakaway/adjustment lines, making it easier to bend the strip along the breakaway/adjustment line, with the perforated metal strip being composed of the metal having mechanical properties that allow the strip to be sharply bent, at least once, along the respective breakaway/adjustment line to an angle somewhat exceeding a right angle without suffering significant weakening from stress fractures, while the same mechanical properties of the metal allow that by repeatedly bending the strip back and forth along the breakaway/adjustment line stress fractures will result, thereby allowing a section of strip to be broken off using ordinary hand tools including pliers, whereupon the section of strip, once detached, is configured as a bracket or strap by utilizing the breakaway/adjustment lines within the section of strip as internal, incremental bending points to fabricate a bracket or strap to a desired and easily repeatable shape and size with well defined, sharp internal angles connected by substantially flat segments of strip, the mounting/splicing holes being of a size useful for and compatible with existing fastening devices in the form of at least one of nails, screws, bolts and nuts, or rivets, the mounting/splicing holes providing a means of attaching brackets and straps fabricated from sections of strip to existing supporting structures by means of at least one existing fastening device in the form of at least one of nails, screws, bolts and nuts, or rivets, the mounting/splicing holes providing a means of attaching multiple sections of strip to one another by means of at least one existing fastening device in the form of at least one of nails, screws, bolts and nuts, or rivets, and the mounting/splicing holes providing a means of supporting and securing in place a multitude of items using brackets and straps fabricated from sections of strip by means of at least one existing fastening device in the form of at least one of nails, screws, bolts and nuts, or rivets.

3. The invention of claim 2, wherein there is at least two mounting/splicing holes that are not aligned with the respective pair of breakaway/adjustment holes between each one of the mounting/splicing holes which is aligned with the pair of the breakaway/adjustment holes.

4. The invention of claim 2, wherein there is at least three mounting/splicing holes that are not aligned with the respective pair of breakaway/adjustment holes between each one of the mounting/splicing holes which is aligned with the pair of the breakaway/adjustment holes.

5. The invention of claim 2, wherein the mounting/splicing holes are at least one of: round, or square.

6. The invention of claim 2, wherein the breakaway/adjustment holes are elongated in a direction of the breakaway/adjustment lines.

7. The invention of claim 3, wherein the breakaway/adjustment holes are elongated in a direction of the breakaway/adjustment lines.

8. The invention of claim 4, wherein the breakaway/adjustment holes are elongated in a direction of the breakaway/adjustment lines.

9. The invention of claim 5, wherein the breakaway/adjustment holes are elongated in a direction of the breakaway/adjustment lines.

10. An invention, useful for rapid, on-site design, fabrication, and installation of mounting brackets and straps, requiring only the invention, simple hand tools, and existing fastening devices in the form of at least one of nails, screws, bolts and nuts, or rivets, the invention comprising a perforated strip of metal, a length of the strip being substantially greater than a width of the strip, the width of the strip being substantially greater than a thickness of the strip, the strip having a central longitudinal axis, the strip having a first longitudinal edge and a second longitudinal edge, with the longitudinal edges being substantially straight and substantially parallel to each other, with the first and second longitudinal edges being substantially parallel to the central longitudinal axis, the central longitudinal axis lying approximately halfway between the first and second longitudinal edges of the strip, the strip being manufactured in the length, the strip being perforated along the length by a row of holes lying approximately on the central longitudinal axis of the strip, the holes in the row having centers that lie approximately on the central longitudinal axis of the strip, the holes being closely spaced apart longitudinally with no additional holes being located between the holes, with center to center distances of adjacent holes within the row being substantially the same along a length of the row, a width of the holes being substantially less than the width of the strip, and substantially greater than the thickness of the strip, the holes in the row hereinafter called mounting/splicing holes, with every third mounting/splicing hole being aligned with a row of holes lying approximately along a line perpendicular to the central longitudinal axis of the strip, the line passing thru the center of the mounting splicing hole and passing approximately thru a center of each of the holes within the respective row of holes, the holes of the rows hereinafter called breakaway/adjustment holes, with there being at least one breakaway/adjustment hole lying between the mounting/splicing hole and the first longitudinal edge of the strip, and there being at least one breakaway/adjustment hole lying between the mounting/splicing hole and the second longitudinal edge of the strip, a width of the breakaway/adjustment holes being substantially less than the width of the strip, and substantially greater than the thickness of the strip, said line perpendicular to the central longitudinal axis of the strip passing thru the center of one of the mounting/splicing holes and passing approximately thru the centers of the holes in the perpendicular row of holes hereinafter called a breakaway/adjustment line, there being the breakaway adjustment line wherever one of the mounting/splicing holes is so aligned with one of the perpendicular rows of the breakaway/adjustment holes, that being every third mounting/splicing hole along the length of the strip, with no additional holes being located between the rows of holes of the breakaway/adjustment holes, and where the breakaway/adjustment line passes approximately thru the center of the mounting/splicing hole and thru the center of each respective hole of the perpendicular row of breakaway/adjustment holes, a cross-sectional area of the strip is considerably less along the breakaway/adjustment line than between the breakaway/adjustment lines, making it easier to bend the strip along the breakaway/adjustment line, with the perforated metal strip being composed of the metal having mechanical properties that allow the strip to be sharply bent, at least once, along the breakaway/adjustment line to an angle somewhat exceeding a right angle without suffering significant weakening from stress fractures, while the same mechanical properties of the metal allow that by repeatedly bending the strip back and forth along the breakaway/adjustment line stress fractures will result, thereby allowing a section of strip to be broken off using ordinary hand tools including pliers, whereupon the section of strip, once detached, is configured as a bracket or strap by utilizing the breakaway/adjustment lines within the section of strip as internal, incremental bending points to fabricate a bracket or strap to a desired and easily repeatable shape and size with well defined, sharp internal angles connected by substantially flat segments of strip, the mounting/splicing holes being of a size useful for and compatible with existing fastening devices in the form of at least one of nails, screws, bolts and nuts, or rivets, the mounting/splicing holes providing a means of attaching brackets and straps fabricated from sections of strip to existing supporting structures by means of at least one existing fastening device in the form of at least one of nails, screws, bolts and nuts, or rivets, the mounting/splicing holes providing a means of attaching multiple sections of strip to one another by means of at least one existing fastening device in the form of at least one of nails, screws, bolts and nuts, or rivets, and the mounting/splicing holes providing a means of supporting and securing in place a multitude of items using brackets and straps fabricated from sections of strip by means of at least one existing fastening device in the form of at least one of nails, screws, bolts and nuts, or rivets.

11. The invention of claim 10, wherein at least one of the at least one breakaway/adjustment hole lying between the mounting/splicing hole and the first longitudinal edge of the strip, and the at least one breakaway/adjustment hole lying between the mounting/splicing hole and the second longitudinal edge of the strip, being at least two of the at least one breakaway/adjustment hole lying between the mounting/splicing hole and the first longitudinal edge of the strip, and at least two of the at least one breakaway/adjustment hole lying between the mounting/splicing hole and the second longitudinal edge of the strip.

12. The invention of claim 10, wherein the mounting/splicing holes are at least one of: round, or square.

13. The invention of claim 11, wherein the mounting/splicing holes are at least one of: round, or square.

14. The invention of claim 10, wherein the at least one breakaway/adjustment hole lying between the mounting/splicing hole and the first longitudinal edge of the strip, and the at least one breakaway/adjustment hole lying between the mounting/splicing hole and the second longitudinal edge of the strip are at least one of: elongated in a direction of the breakaway/adjustment lines, square, triangular or circular.

15. The invention of claim 11, wherein the at least two breakaway/adjustment holes lying between the mounting/splicing hole and the first longitudinal edge of the strip, and the at least two breakaway/adjustment holes lying between the mounting/splicing hole and the second longitudinal edge of the strip are at least one of: elongated in a direction of the breakaway/adjustment lines, square, triangular or circular.

16. An invention, useful for rapid, on-site design, fabrication, and installation of mounting brackets and straps, requiring only the invention, simple hand tools, and existing fastening devices in the form of at least one of nails, screws, bolts and nuts, or rivets, the invention consisting of a perforated strip of metal, a length of the strip being substantially greater than a width of the strip, the width of the strip being substantially greater than a thickness of the strip, the strip having a first longitudinal edge and a second longitudinal edge, with the longitudinal edges being substantially straight and parallel, the strip being manufactured in the length, the strip being longitudinally perforated end to end by three rows of holes, the three rows of holes being substantially straight, the three rows of holes being substantially parallel to each other, the three rows of holes being substantially parallel with the first and second longitudinal edges of the strip, with a first of the three rows of holes lying approximately on a central longitudinal axis of the strip, the holes in the first row having centers that lie approximately on the central longitudinal axis of the strip, the holes being closely spaced apart longitudinally and being circular, with center to center distances between adjacent holes within the first row being substantially the same along a length of the first row, a width of the holes being substantially less than the width of the strip, and substantially greater than the thickness of the strip, the holes in the first row hereinafter called mounting/splicing holes, with a second of the three rows of holes lying approximately along a first longitudinal line parallel to the central longitudinal axis, the first longitudinal line being straight and substantially parallel with the longitudinal edges of the strip, the first longitudinal line lying approximately halfway between the central longitudinal axis of the strip and the first longitudinal edge of the strip, the holes in the second row having centers that lie approximately on the first longitudinal line, the holes being spaced apart longitudinally, with center to center distances between adjacent holes within the second row being substantially the same along a length of the second row, a width of the holes being substantially less than the width of the strip, and substantially greater than the thickness of the strip, the holes in the second row hereinafter called breakaway/adjustment holes, the row of second holes lying along the first longitudinal line being a first of two rows of breakaway/adjustment holes, with a third of the three rows of holes lying approximately along a second longitudinal line parallel to the central longitudinal axis, the second longitudinal line being straight and parallel to the first longitudinal line, the second longitudinal line being substantially parallel with the longitudinal edges of the strip, the second longitudinal line lying approximately halfway between the central longitudinal axis of the strip and the second longitudinal edge of the strip, the holes in the third row having centers that lie approximately on the second longitudinal line, the holes being spaced apart longitudinally, with center to center distances between adjacent holes within the third row being substantially the same along a length of the third row, a width of the holes being substantially less than the width of the strip, and substantially greater than the thickness of the strip, the holes in the third row hereinafter called breakaway/adjustment holes, the third row of holes lying along the second longitudinal line being a second of the two rows of breakaway/adjustment holes, with the first row of breakaway/adjustment holes lying approximately halfway between the first row of mounting/splicing holes and the first longitudinal edge of the strip, and the second row of breakaway/adjustment holes lying approximately halfway between the first row of mounting/splicing holes and the second longitudinal edge of the strip, with the center to center spacing of adjacent breakaway/adjustment holes in the first row of breakaway/adjustment holes being substantially the same as the center to center spacing of adjacent breakaway/adjustment holes in the second row of breakaway/adjustment holes, with the first and second rows of breakaway/adjustment holes being longitudinally aligned so that a line perpendicular to the central longitudinal axis, said line passing thru the center of the breakaway/adjustment hole in the first row of breakaway/adjustment holes, also passes approximately thru the center of a corresponding one of the breakaway/adjustment holes in the second row of breakaway/adjustment holes, with the center to center spacing of consecutive mounting/splicing holes being correlated with the center to center spacing of consecutive breakaway/adjustment holes, so that every mounting/splicing hole is aligned with a pair of the breakaway/adjustment holes, one being between the mounting/splicing hole and the first longitudinal edge, and one being between the mounting/splicing hole and the second longitudinal edge, with the centers of all three holes lying approximately on the line perpendicular to the central longitudinal axis of the strip, said line hereinafter called a breakaway/adjustment line, there being the breakaway adjustment line wherever the mounting/splicing hole and the pair of the breakaway/adjustment holes are so aligned, and with the breakaway/adjustment lines passing approximately thru the centers of the mounting/splicing hole and the respective associated pair of breakaway/adjustment holes, a cross-sectional area of the strip is considerably less along the breakaway/adjustment line than between breakaway/adjustment lines, making it easier to bend the strip along the breakaway/adjustment line, with the perforated metal strip being composed of the metal having mechanical properties that allow the strip to be sharply bent, at least once, along the breakaway/adjustment line to an angle somewhat exceeding a right angle without suffering significant weakening from stress fractures, while the same mechanical properties of the metal allow that by repeatedly bending the strip back and forth along the breakaway/adjustment line stress fractures will result, thereby allowing a section of strip to be broken off using ordinary hand tools including pliers, whereupon the section of strip, once detached, is configured as a bracket or strap by utilizing the breakaway/adjustment lines within the section of strip as internal, incremental bending points to fabricate a bracket or strap to a desired and easily repeatable shape and size with well defined, sharp internal angles connected by substantially flat segments of strip, the mounting/splicing holes being of a size useful for and compatible with existing fastening devices in the form of at least one of nails, screws, bolts and nuts, or rivets, the mounting/splicing holes providing a means of attaching brackets and straps fabricated from sections of strip to existing supporting structures by means of at least one existing fastening device in the form of at least one of nails, screws, bolts and nuts, or rivets, the mounting/splicing holes providing a means of attaching multiple sections of strip to one another by means of at least one existing fastening device in the form of at least one of nails, screws, bolts and nuts, or rivets, and the mounting/splicing holes providing a means of supporting and securing in place a multitude of items using brackets and straps fabricated from sections of strip by means of at least one existing fastening device in the form of at least one of nails, screws, bolts and nuts, or rivets.

17. An invention, useful for rapid, on-site design, fabrication, and installation of mounting brackets and straps, requiring only the invention, simple hand tools, and existing fastening devices in the form of at least one of nails, screws, bolts and nuts, or rivets, the invention consisting of a perforated strip of metal, a length of the strip being substantially greater than a width of the strip, the width of the strip being substantially greater than a thickness of the strip, the strip having a first longitudinal edge and a second longitudinal edge, with the longitudinal edges being substantially straight and parallel, the strip being manufactured in the length, the strip being longitudinally perforated end to end by three rows of holes, the three rows of holes being substantially straight, the three rows of holes being substantially parallel to each other, the three rows of holes being substantially parallel with the first and second longitudinal edges of the strip, with a first of the three rows of holes lying approximately on a central longitudinal axis of the strip, the holes in the first row having centers that lie approximately on the central longitudinal axis of the strip, the holes being closely spaced apart longitudinally and being circular, with center to center distances between adjacent holes within the first row being substantially the same along a length of the first row, a width of the holes being substantially less than the width of the strip, and substantially greater than the thickness of the strip, the holes in the first row hereinafter called mounting/splicing holes, with a second of the three rows of holes lying approximately along a first longitudinal line parallel to the central longitudinal axis, the first longitudinal line being straight and substantially parallel with the longitudinal edges of the strip, the first longitudinal line lying approximately halfway between the central longitudinal axis of the strip and the first longitudinal edge of the strip, the holes in the second row having centers that lie approximately on the first longitudinal line, the holes being spaced apart longitudinally, with center to center distances between adjacent holes within the second row being substantially the same along a length of the second row, a width of the holes being substantially less than the width of the strip, and substantially greater than the thickness of the strip, the holes in the second row hereinafter called breakaway/adjustment holes, the second row of holes lying along the first longitudinal line being a first of two rows of breakaway/adjustment holes, with a third of the three rows of holes lying approximately along a second longitudinal line parallel to the central longitudinal axis, the second longitudinal line being straight and parallel to the first longitudinal line, the second longitudinal line being substantially parallel with the longitudinal edges of the strip, the second longitudinal line lying approximately halfway between the central longitudinal axis of the strip and the second longitudinal edge of the strip, the holes in the third row having centers that lie approximately on the second longitudinal line, the holes being spaced apart longitudinally, with center to center distances between adjacent holes within the third row being substantially the same along a length of the third row, a width of the holes being substantially less than the width of the strip, and substantially greater than the thickness of the strip, the holes in the third row hereinafter called breakaway/adjustment holes, the third row of holes lying along the second longitudinal line being a second of the two rows of breakaway/adjustment holes, with the first row of breakaway/adjustment holes lying approximately halfway between the first row of mounting/splicing holes and the first longitudinal edge of the strip, and the second row of breakaway/adjustment holes lying approximately halfway between the first row of mounting/splicing holes and the second longitudinal edge of the strip, with the center to center spacing of adjacent ones of the breakaway/adjustment holes in the first row of breakaway/adjustment holes being substantially the same as the center to center spacing of adjacent ones of the breakaway/adjustment holes in the second row of breakaway/adjustment holes, with the first and second rows of breakaway/adjustment holes being longitudinally aligned so that a line perpendicular to the central longitudinal axis, said line passing thru the center of the breakaway/adjustment hole in the first row of breakaway/adjustment holes, also passes approximately thru the center of a corresponding one of the breakaway/adjustment holes in the second row of breakaway/adjustment holes, with the center to center spacing of consecutive ones of the mounting/splicing holes being correlated with the center to center spacing of consecutive ones of the breakaway/adjustment holes, so that every mounting/splicing hole is aligned with a pair of the breakaway/adjustment holes, one being between the mounting/splicing hole and the first longitudinal edge, and one being between the mounting/splicing hole and the second longitudinal edge, with the centers of all three holes lying approximately on the line perpendicular to the central longitudinal axis of the strip, said line hereinafter called a breakaway/adjustment line, there being the breakaway adjustment line wherever the mounting/splicing hole and the pair of breakaway/adjustment holes are so aligned, and with the breakaway/adjustment lines passing approximately thru the centers of the mounting/splicing hole and the respective associated pair of breakaway/adjustment holes, a cross-sectional area of the strip is considerably less along the breakaway/adjustment line than between breakaway/adjustment lines, making it easier to bend the strip along the breakaway/adjustment line, with the perforated metal strip being composed of the metal having mechanical properties that allow the strip to be sharply bent, at least once, along the breakaway/adjustment line to an angle somewhat exceeding a right angle without suffering significant weakening from stress fractures, while the same mechanical properties of the metal allow that by repeatedly bending the strip back and forth along the breakaway/adjustment line stress fractures will result, thereby allowing a section of strip to be broken off using ordinary hand tools including pliers, whereupon the section of strip, once detached, is configured as a bracket or strap by utilizing the breakaway/adjustment lines within the section of strip as internal, incremental bending points to fabricate a bracket or strap to a desired and easily repeatable shape and size with well defined, sharp internal angles connected by substantially flat segments of strip, the mounting/splicing holes being elongated in the direction of the breakaway/adjustment lines and of a size useful for and compatible with existing fastening devices in the form of at least one of nails, screws, bolts and nuts, or rivets, the mounting/splicing holes providing a means of attaching brackets and straps fabricated from sections of strip to existing supporting structures by means of at least one existing fastening device in the form of at least one of nails, screws, bolts and nuts, or rivets, the mounting/splicing holes providing a means of attaching multiple sections of strip to one another by means of at least one existing fastening device in the form of at least one of nails, screws, bolts and nuts, or rivets, and the mounting/splicing holes providing a means of supporting and securing in place a multitude of items using brackets and straps fabricated from sections of strip by means of at least one existing fastening device in the form of at least one of nails, screws, bolts and nuts, or rivets.

* * * * *